United States Patent
Nakano et al.

(10) Patent No.: US 10,703,261 B2
(45) Date of Patent: Jul. 7, 2020

(54) MOUNTING PEDESTAL, COMPONENT MOUNTING MODULE, AND MOVING BODY

(71) Applicant: PANASONIC INTELLECTUAL PROPERTY MANAGEMENT CO., LTD., Osaka (JP)

(72) Inventors: Tomoyuki Nakano, Osaka (JP); Takahiro Miyake, Osaka (JP); Yoshihiro Kawakita, Osaka (JP); Takashi Matsuda, Hyogo (JP); Masahiro Kasano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 16/014,756

(22) Filed: Jun. 21, 2018

(65) Prior Publication Data

US 2018/0370421 A1    Dec. 27, 2018

(30) Foreign Application Priority Data

Jun. 26, 2017   (JP) .................... 2017-123803

(51) Int. Cl.
| | |
|---|---|
| *B60Q 1/26* | (2006.01) |
| *F21S 43/14* | (2018.01) |
| *F21S 43/40* | (2018.01) |
| *B62J 6/04* | (2020.01) |
| *F21S 43/19* | (2018.01) |

(Continued)

(52) U.S. Cl.
CPC ............ *B60Q 1/2696* (2013.01); *B62J 6/04* (2013.01); *F21S 41/143* (2018.01); *F21S 41/192* (2018.01); *F21S 41/24* (2018.01); *F21S 41/27* (2018.01); *F21S 41/295* (2018.01); *F21S 41/322* (2018.01); *F21S 43/14* (2018.01); *F21S 43/195* (2018.01); *F21S 43/315* (2018.01);

(Continued)

(58) Field of Classification Search
None
See application file for complete search history.

(56) References Cited

U.S. PATENT DOCUMENTS

| | | | | |
|---|---|---|---|---|
| 2009/0103295 A1* | 4/2009 | Wang | ................. | F21K 9/00 |
| | | | | 362/234 |
| 2009/0104804 A1* | 4/2009 | Lin | ................. | F21K 9/00 |
| | | | | 439/211 |

(Continued)

FOREIGN PATENT DOCUMENTS

| | | |
|---|---|---|
| EP | 1 332 957 | 8/2003 |
| JP | 2003-229005 | 8/2003 |

(Continued)

*Primary Examiner* — Elmito Breval
(74) *Attorney, Agent, or Firm* — Greenblum & Bernstein, P.L.C.

(57) ABSTRACT

A mounting pedestal on which a heat generating component is disposed is provided. The mounting pedestal includes a substrate which includes a plurality of bending portions at which the substrate is bent in a staircase shape. An insulating layer is disposed on a surface of the substrate. An interconnecting line is disposed on the insulating layer. In the mounting pedestal, the interconnecting line extends across the plurality of bending portions. In each of the plurality of bending portions, a corner radius (R) of a mountain portion is greater than a corner R of a valley portion.

24 Claims, 19 Drawing Sheets

(51) Int. Cl.
*F21S 43/31* (2018.01)
*F21S 43/37* (2018.01)
*F21S 41/29* (2018.01)
*F21S 41/27* (2018.01)
*F21S 41/24* (2018.01)
*F21S 41/32* (2018.01)
*F21S 41/143* (2018.01)
*F21S 41/19* (2018.01)
*F21W 103/55* (2018.01)

(52) U.S. Cl.
CPC ............... *F21S 43/37* (2018.01); *F21S 43/40* (2018.01); *F21W 2103/55* (2018.01)

(56) References Cited

U.S. PATENT DOCUMENTS

| | | | |
|---|---|---|---|
| 2011/0228536 A1* | 9/2011 | Im | F21S 41/192 |
| | | | 362/249.06 |
| 2015/0003083 A1 | 1/2015 | Uehara | |
| 2017/0045190 A1* | 2/2017 | Song | F21S 41/192 |
| 2017/0113605 A1* | 4/2017 | Daicho | F21S 43/00 |

FOREIGN PATENT DOCUMENTS

| | | |
|---|---|---|
| JP | 2010-186699 | 8/2010 |
| JP | 2013-4423 | 1/2013 |
| JP | 2015-79614 | 4/2015 |
| JP | 2015-149288 | 8/2015 |
| JP | 2016-21555 | 2/2016 |

\* cited by examiner

FIG. 1
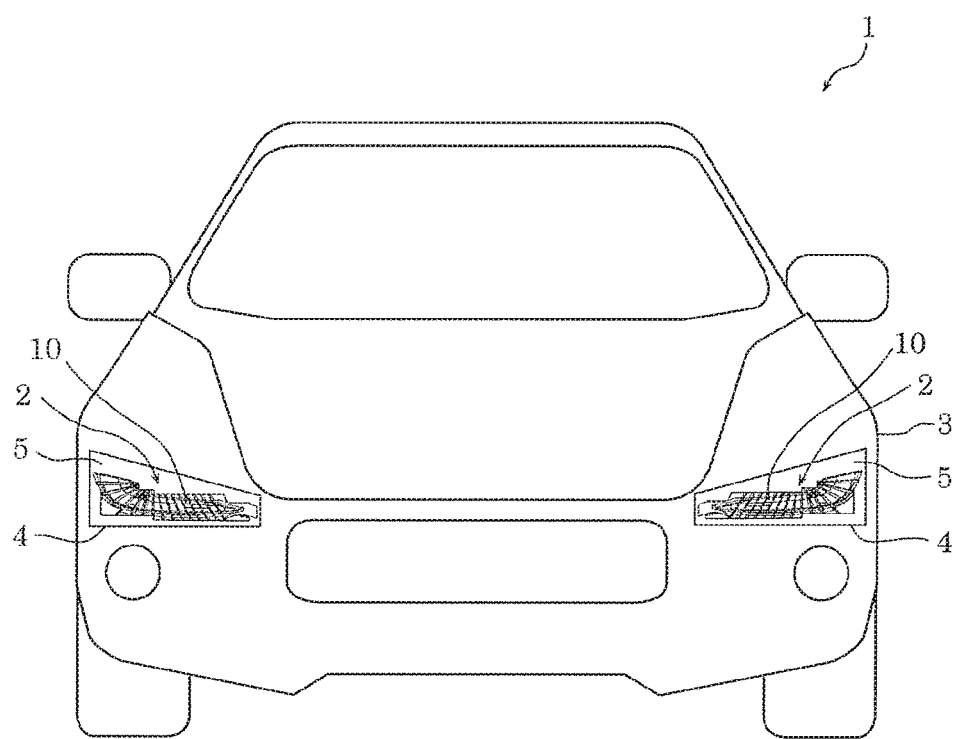
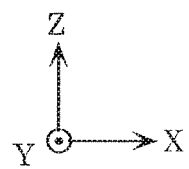

MOUNTING PEDESTAL, COMPONENT MOUNTING MODULE, AND MOVING BODY

CROSS REFERENCE TO RELATED APPLICATION

This application claims the benefit of priority of Japanese Patent Application Number 2017-123803 filed on Jun. 26, 2017, the entire content of which is hereby incorporated by reference.

BACKGROUND

1. Technical Field

The present disclosure relates to a mounting pedestal, a component mounting module, and a moving body.

2. Description of the Related Art

A lighting device such as a headlight, a taillight, etc. is mounted on vehicles such as four-wheeled vehicles. Conventionally, halogen bulb lamps or high-Intensity discharge (HID) lamps are used as light sources of lighting devices to be mounted on vehicles.

Recent years have seen rapid progress in the development of products which use a semiconductor light emitting element such as a light emitting diode (LED) as a light source. As lighting devices to be mounted on vehicles, products which use an LED as a light source have been developed as well because such products make it possible to implement higher emission efficiency and longer life than HID lamps.

Conventionally, as this type of a lighting device to be mounted on vehicles, for example, Japanese Unexamined Patent Application Publication No. 2003-229005 discloses a vehicular taillight which includes a substrate having a staircase shape, and an LED light source mounted on the substrate having the staircase shape.

SUMMARY

An LED chip used in an LED light source generates heat from the LED chip as a result of light emission. The temperature of the LED chip increases due to the generated heat, leading to a decrease in light emission. In addition, an LED chip breaks at a relatively low temperature of 150 degrees Celsius to 175 degrees Celsius. Moreover, the ambient temperature in service of the lighting device to be mounted on vehicles is as high as 125 degrees Celsius, and an allowable temperature rise is as small as 25 degrees Celsius to 50 degrees Celsius. Thus, when an LED light source is used as a light source for a lighting device to be mounted on vehicles, heat generated in an LED chip needs to be effectively dissipated.

The present disclosure provides a solution to the above-described problems, and an object of the present disclosure is to provide a mounting pedestal, etc., which are capable of efficiently dissipating heat of a heat generating component such as a light emitting element.

In order to achieve the above-described object, a mounting pedestal according to one aspect of the present disclosure is a mounting pedestal on which a heat generating component is disposed. The mounting pedestal includes: a substrate which includes a plurality of bending portions at which the substrate is bent in a staircase shape; an insulating layer disposed on a surface of the substrate; and an interconnecting line disposed on the insulating layer. In the mounting pedestal, the interconnecting line extends across the plurality of bending portions, and in each of the plurality of bending portions, a corner radius (R) of a mountain portion is greater than a corner $R_v$ of a valley portion.

Furthermore, a component mounting module according to one aspect of the present disclosure includes the above-described mounting pedestal and a heat generating component disposed on the mounting pedestal.

In addition, a moving body according to one aspect of the present disclosure includes a light emitting module that is the above-described component mounting module, and a vehicle body on which the light emitting module is mounted.

According to the present disclosure, it is possible to implement a mounting pedestal, etc., which are capable of efficiently dissipating heat of a heat generating component such as a light emitting element.

BRIEF DESCRIPTION OF DRAWINGS

The figures depict one or more implementations in accordance with the present teaching, by way of examples only, not by way of limitations. In the like reference numerals refer to the same or similar elements.

FIG. 1 is a front view which illustrates a vehicle according to an embodiment;

DETAILED DESCRIPTION OF THE EMBODIMENT

Figure 2:
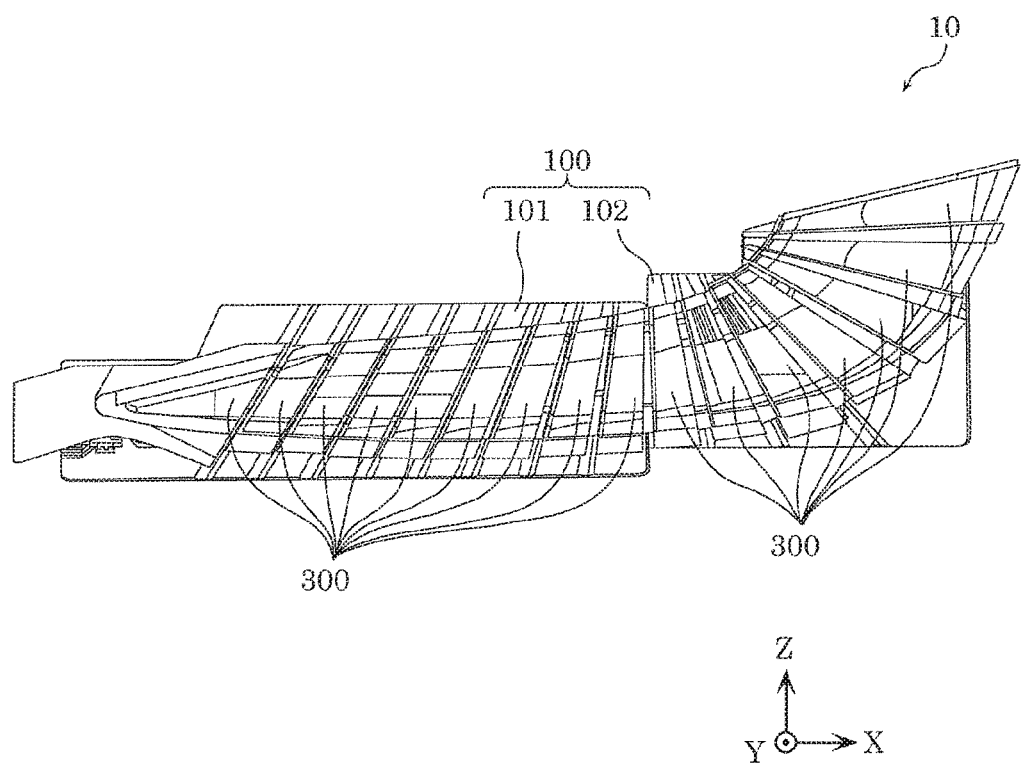
FIG. 2 is a front view which illustrates a light emitting module according to the embodiment.

Hereinafter, an embodiment of the present disclosure will be described with reference to the drawings. The embodiment described below shows a specific example of the present disclosure. Therefore, numerical values, shapes, materials, structural components, the arrangement and connection of the structural components, etc. shown in the following embodiment are mere examples, and are not intended to limit the scope of the present disclosure. Accordingly, among the structural components in the following embodiment, structural components not recited in any one of the independent claims which indicate the broadest concept of the present disclosure are described as optional structural components.

It should be noted that the figures are schematic diagrams and are not necessarily precise illustrations. Moreover, in the figures, substantially identical components are assigned with the same reference signs, and overlapping description thereof is omitted or simplified.

As described herein, "front" and "forward" refer to the direction in which light is emitted from the lighting device (i.e., the light emitting direction) and the light-extraction direction in which light is extracted (i.e., the illumination direction), and "back" and "behind" refer to the direction opposite the front/forward direction. In addition, "front" and "forward" refer to a direction of travel when a vehicle moves ahead, and a side of the vehicle on which a ceiling of the vehicle is located is defined as an "upper side", and the opposite side is defined as a "lower side".

Additionally, the Y-axis directions correspond to the back and front directions, the Z-axis directions correspond to the up and down (vertical) directions, and the X-axis directions correspond to the right and left (horizontal) directions. In the following embodiment, the "front" or "forward" which is the direction in which light is emitted from the lighting device (light emitting module) is a positive direction of the Y-axis.

Embodiment (Vehicle)

First, vehicle 1 according to an embodiment will be described with reference to FIG. 1. FIG. 1 is a front view which illustrates vehicle 1 according to the embodiment.

Vehicle 1 is one example of a moving body. According to the present embodiment, vehicle 1 is a four-wheeled vehicle such as a gasoline vehicle propelled by a gasoline engine, an electric vehicle propelled by an electric engine, or a hybrid vehicle or the like.

As illustrated in FIG. 1, vehicle 1 includes lighting device 2 and vehicle body 3 on which lighting device 2 is installed. Lighting device 2 is, for example, a headlight (head lamp), and mounted one by one on the right and left of a front portion of vehicle body 3.

Vehicle body 3 includes housing 4 for storing lighting device 2, and front cover 5 disposed on a front face of housing 4.

Housing 4 is, for example, a metal casing and has an opening portion from which light emitted from lighting device 2 exits. Front cover 5 is a headlight cover that is light transmissive, and disposed on the opening portion of housing 4.

Lighting device 2 is a lighting device used for a moving body, and used as a lamp which emits light forward from vehicle 1 according to the present embodiment. Lighting device 2 is disposed behind front cover 5. In addition, lighting device 2 is attached to housing 4. The light emitted by lighting device 2 passes through front cover 5 and is irradiated forward of vehicle 1.

Lighting device 2 includes light emitting module 10 and a base member (not illustrated) which supports light emitting module 10. Accordingly, light emitting module 10 is mounted on vehicle body 3. The base member that supports light emitting module 10 also functions as a heat sink for dissipating heat generated in light emitting module 10 as well as being a pedestal to which light emitting module 10 is attached.

Light emitting module 10 is one example of a component mounting module on which a light emitting element is disposed as an electronic component. According to the present embodiment, light emitting module 10 is a light source of lighting device 2, and emits white light forward as illuminating light.

(Light Emitting Module)

Figure 3:
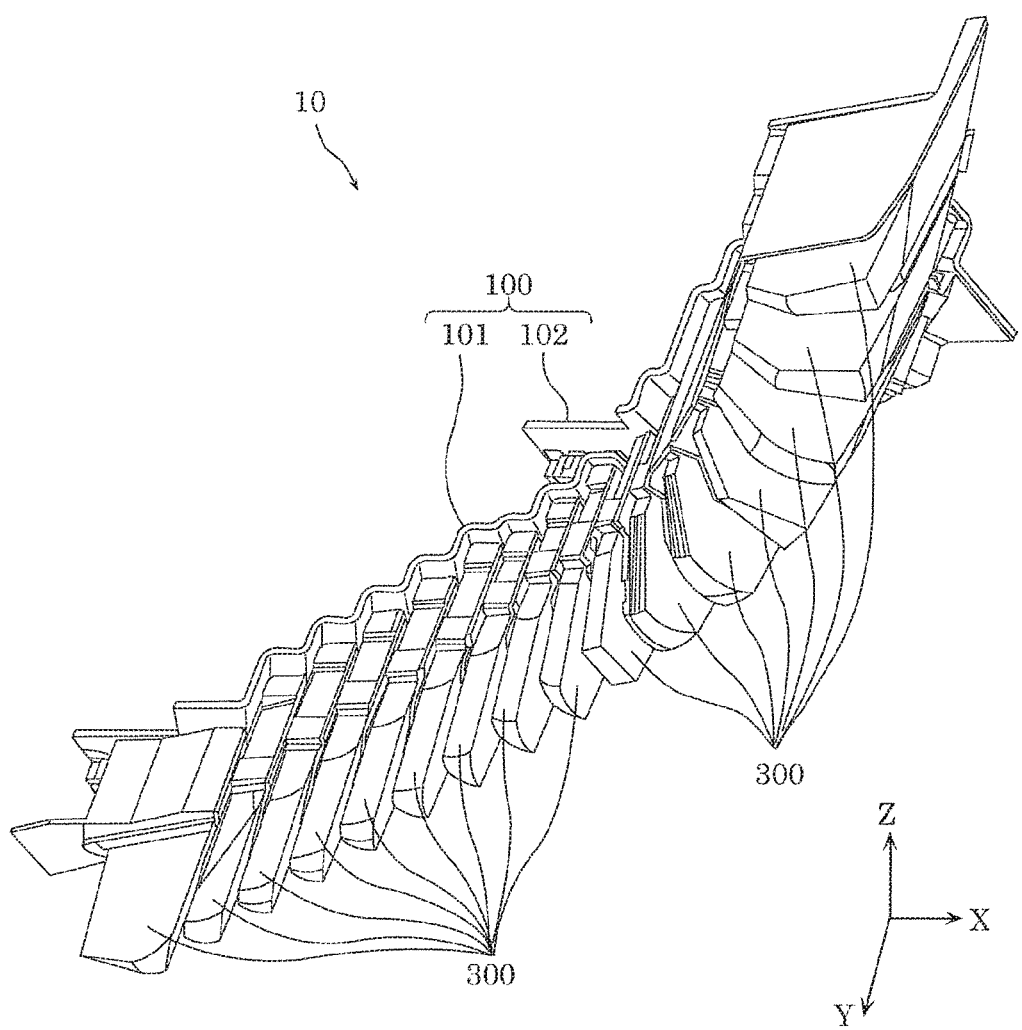
FIG. 3 is a perspective view which illustrates the light emitting module according to an embodiment, when viewed from obliquely above.
Figure 4:
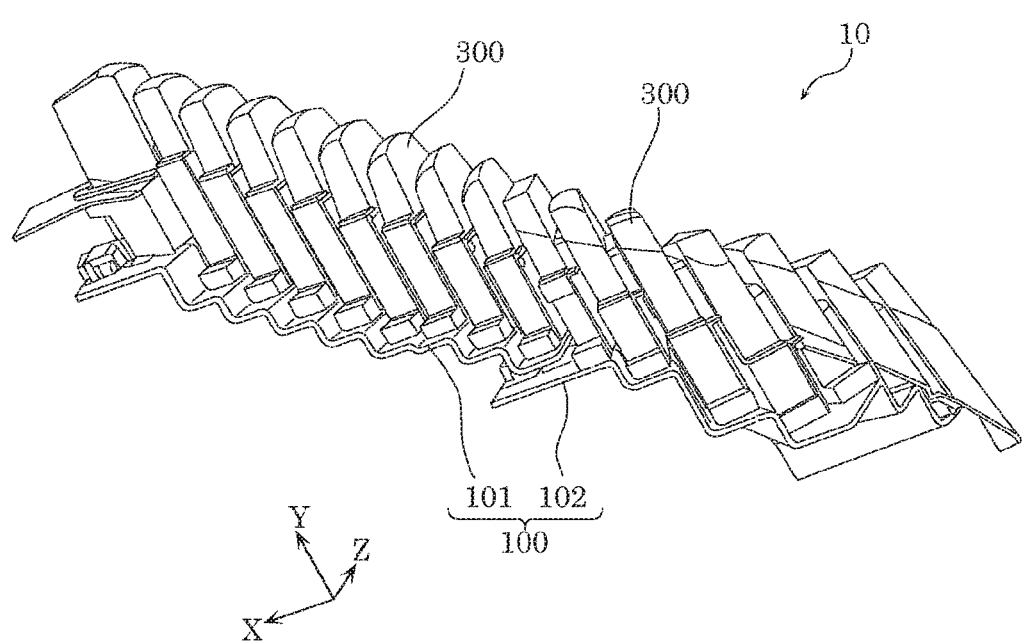
FIG. 4 is a perspective view which illustrates the light emitting module according to an embodiment, when viewed from obliquely below.
Figure 5:
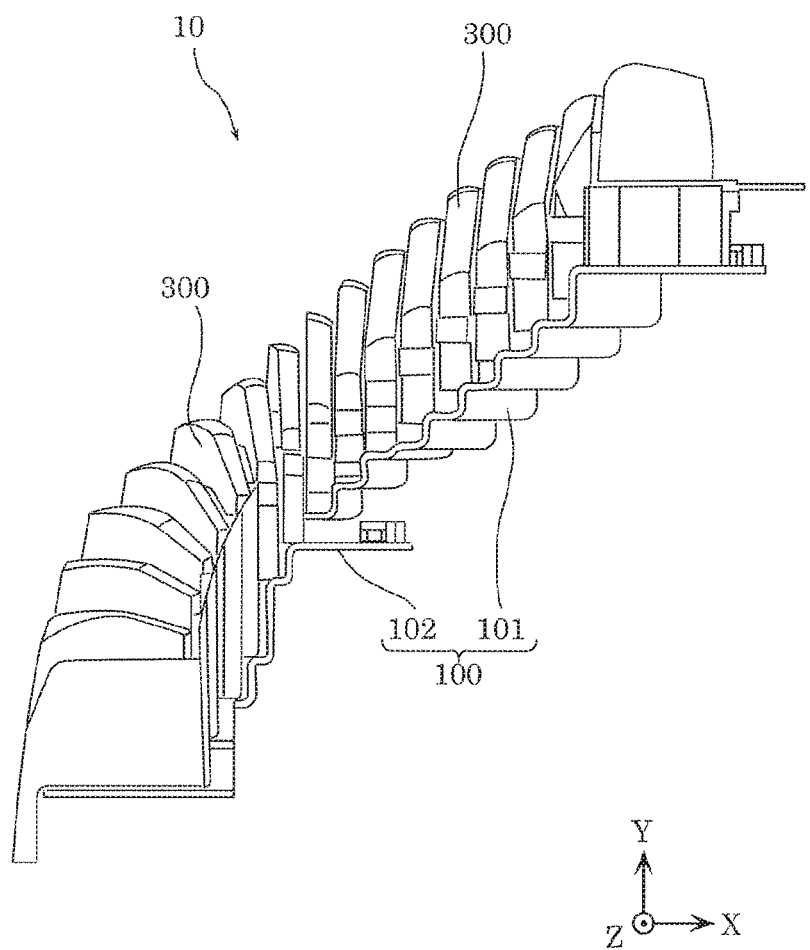
FIG. 5 is a top view which illustrates the light emitting module according to an embodiment.
Figure 6:
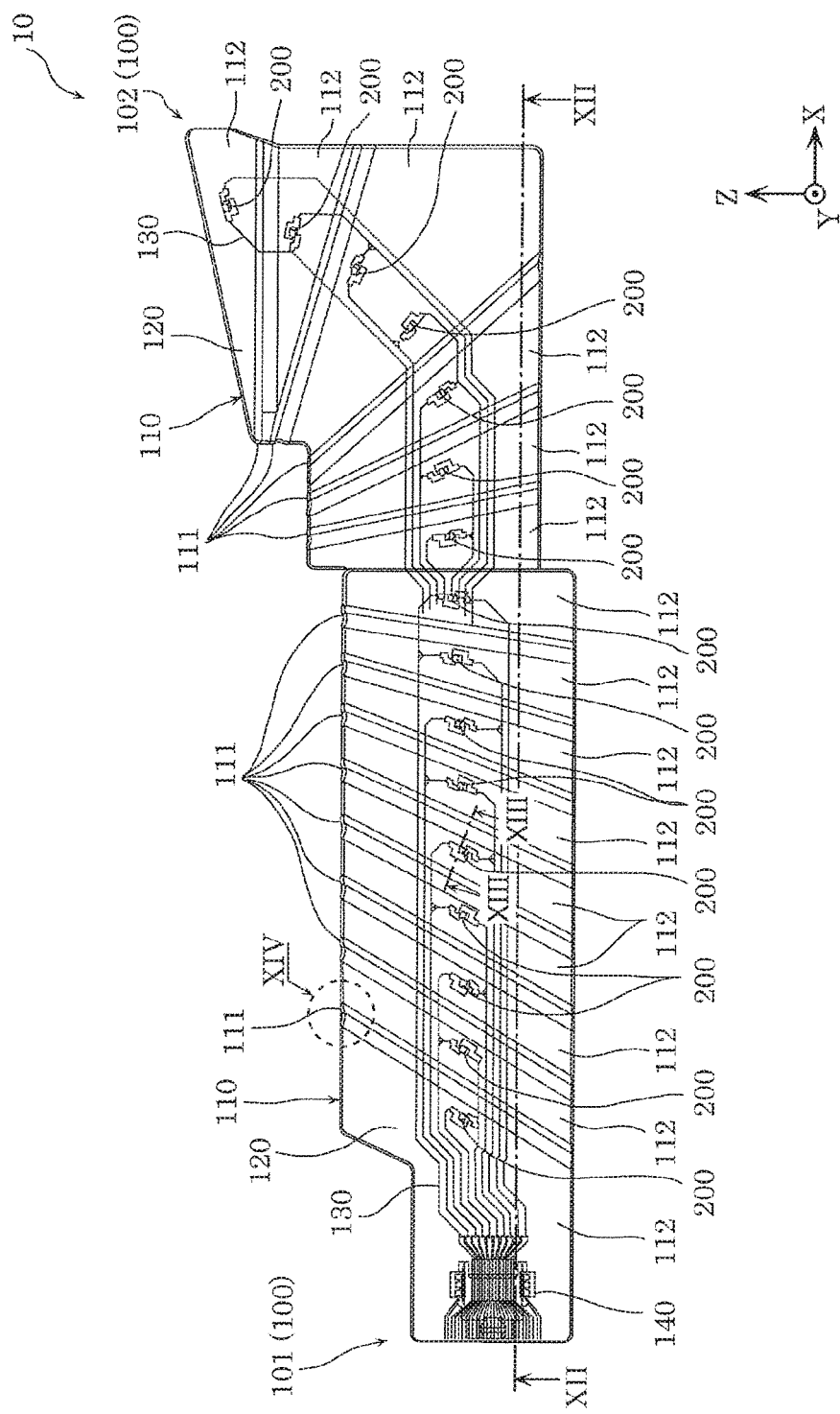
FIG. 6 is a front view which illustrates the light emitting module according to the embodiment, with a light distribution control component being detached.
Figure 7:
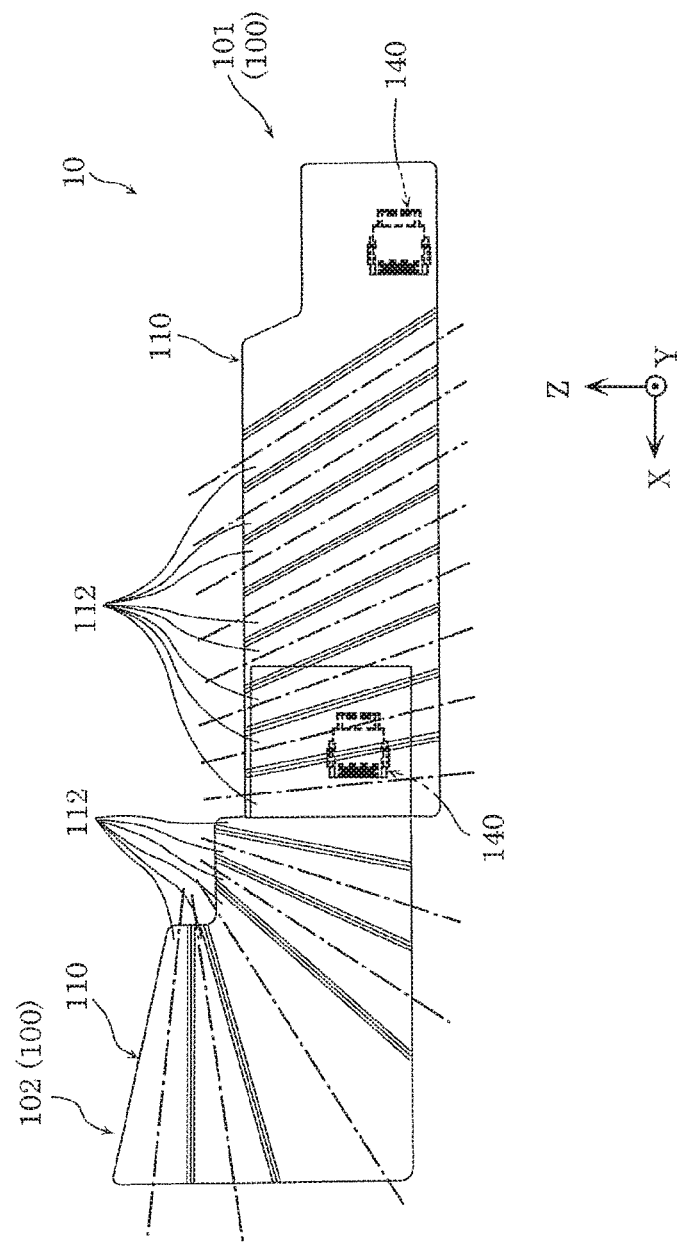
FIG. 7 is a back view which illustrates the light emitting module according to the embodiment, with the light distribution control component being detached.
Figure 8:
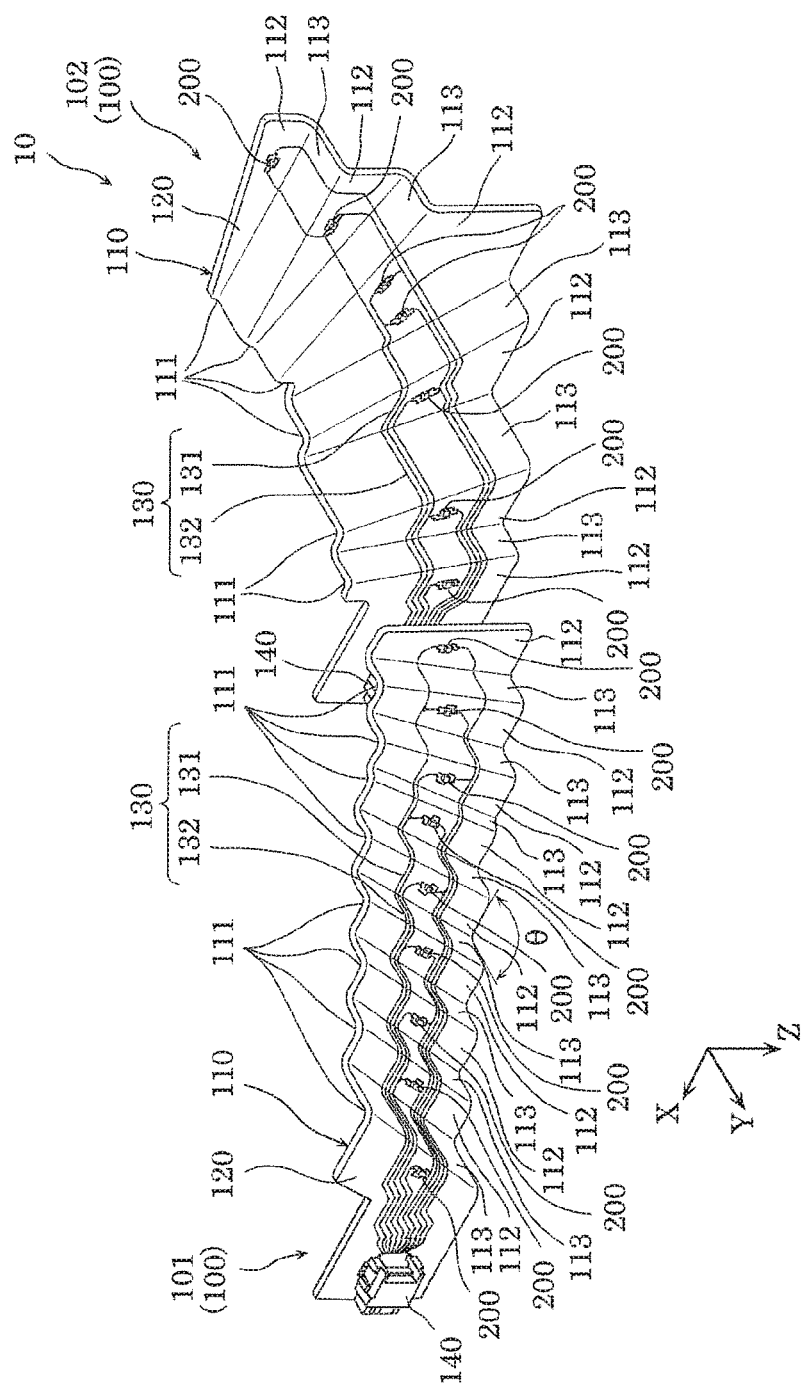
FIG. 8 is a perspective view which illustrates the light emitting module according to the embodiment, with the light distribution control component being detached, when viewed from obliquely above.
Figure 9:
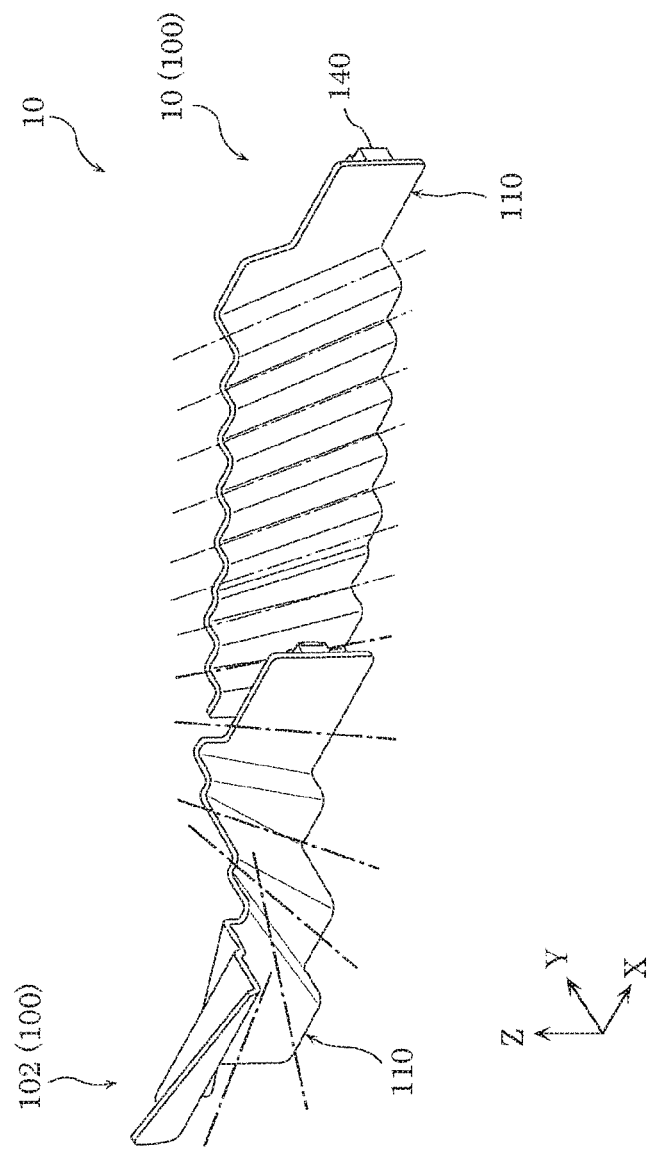
FIG. 9 is a perspective view which illustrates the light emitting module according to the embodiment, with the light distribution control component being detached, when viewed from obliquely below.
Figure 10:
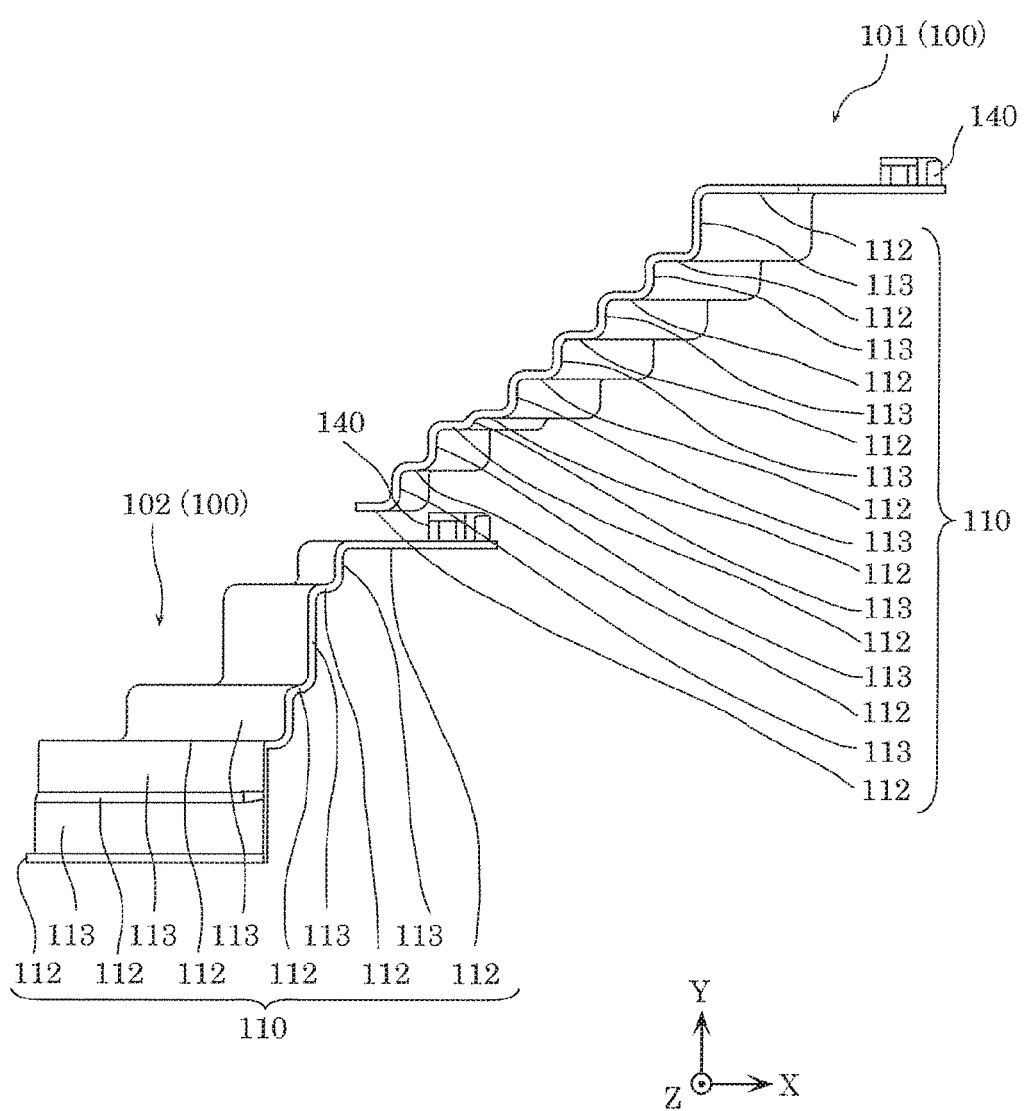
FIG. 10 is a top view which illustrates the light emitting module according to the embodiment, with the light distribution control component being detached.
Figure 11:
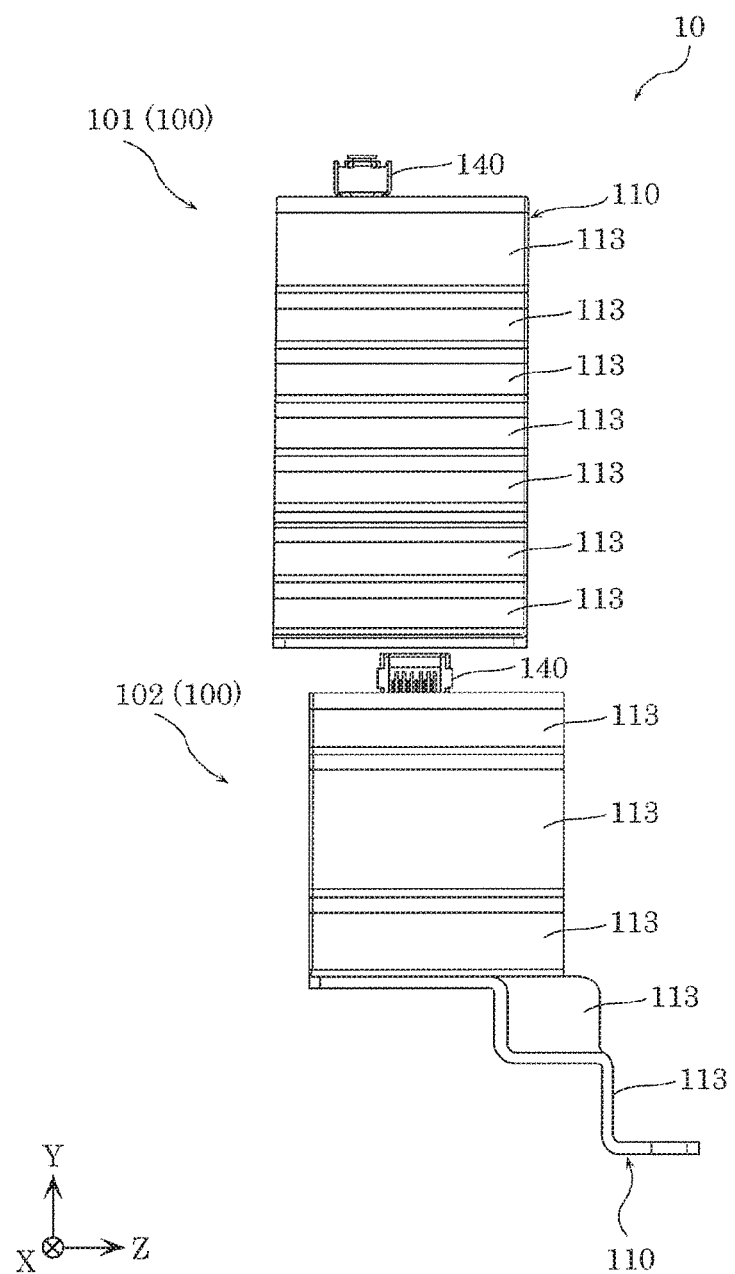
FIG. 11 is a side view which illustrates the light emitting module according to the embodiment, with the light distribution control component being detached.
Figure 12:
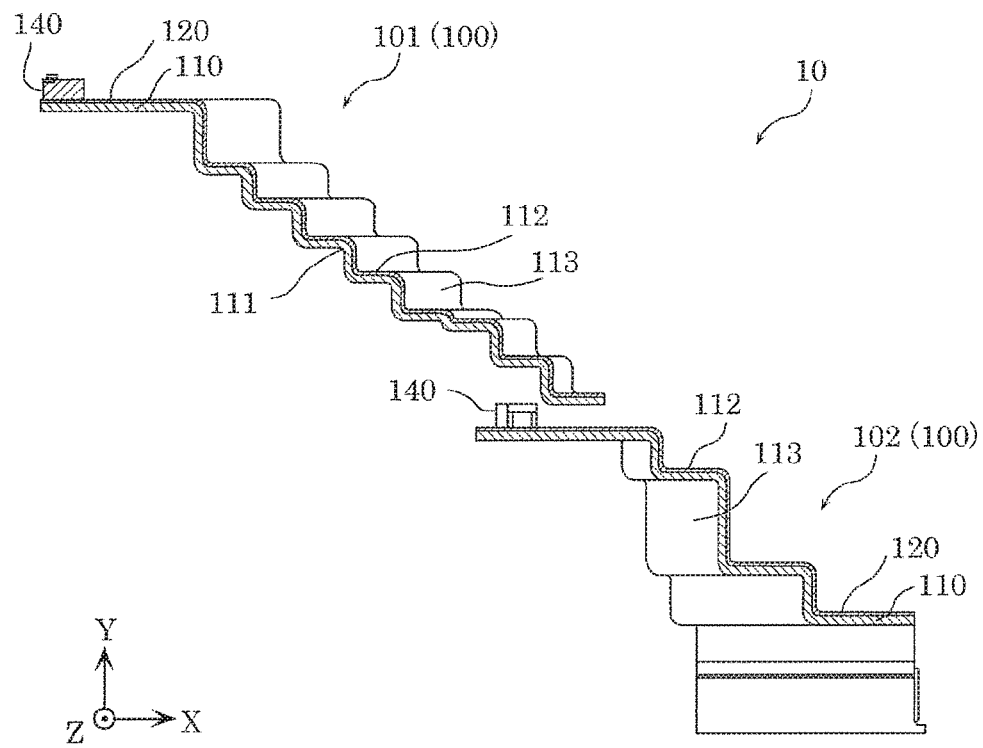
FIG. 12 is a cross sectional view which illustrates the light emitting module according to the embodiment, taken along the line XII-XII indicated in FIG. 6.
Figure 13:
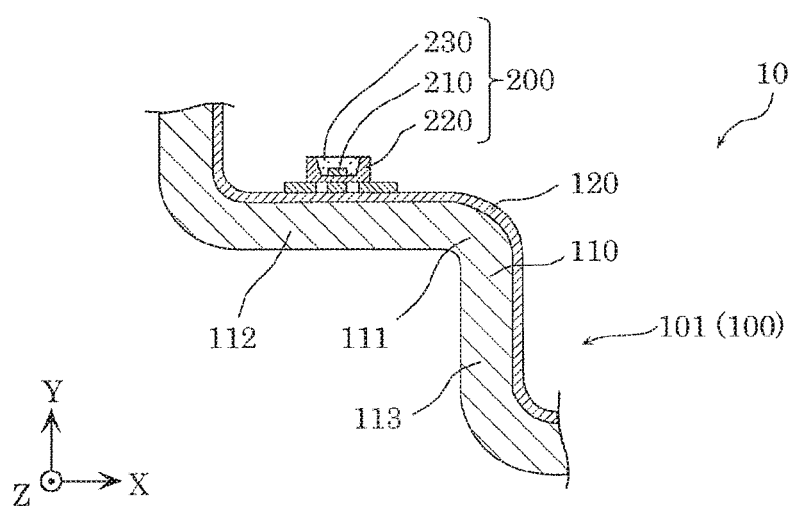
FIG. 13 is a cross sectional view which illustrates the light emitting module according to the embodiment, taken along the line XIII-XIII indicated in FIG. 6.

The following describes a specific configuration of light emitting module 10 according to the embodiment with reference to FIG. 2 to FIG. 13. FIG. 2 to FIG. 5 each illustrates an overall configuration of light emitting module 10 according to the embodiment. FIG. 2 is a front view, FIG. 3 is a perspective view when viewed from obliquely above, FIG. 4 is a perspective view when viewed from obliquely below, and FIG. 5 is a top view. In addition, FIG. 6 to FIG. 13 each illustrates a configuration of the above described light emitting module 10 when light distribution control component 300 is detached. FIG. 6 is a front view, FIG. 7 is a rear view, FIG. 8 is a perspective view when viewed from obliquely above, FIG. 9 is a perspective view when viewed from obliquely below, FIG. 10 is a top view, FIG. 11 is a side view, FIG. 12 is a cross-sectional view taken along the line XII-XII indicated in FIG. 6, and FIG. 13 is a cross-sectional view taken along the line XIII-XIII indicated in FIG. 6. It should be noted that interconnecting line 130 and light emitting element 200 are omitted in FIG. 10 to FIG. 12.

As illustrated in FIG. 2 to FIG. 13, light emitting module 10 includes mounting pedestal 100 having a staircase shape, light emitting element 200 (FIG. 6, etc.) mounted on mounting pedestal 100, and light distribution control component 300 disposed on the light exit side of light emitting element 200.

According to the present embodiment, light emitting module 10 is an LED module in which an LED element is used as light emitting element 200, and emits white light, for example. Light emitting module 10 is attached to a base component included in lighting device 2. In this case, although not illustrated, mounting pedestal 100 having a staircase shape is fixed to the base component. Accordingly, the surface shape of the base component is a staircase shape so as to correspond to the rear-surface shape of mounting pedestal 100. However, the surface shape of the base component according to the present embodiment not limited to this example.

The following describes in detail each of the structural components of light emitting module 10.

(Mounting Pedestal)

As illustrated in FIG. 2 to FIG. 13, mounting pedestal 100 according to the present embodiment includes two components, namely, first mounting pedestal 101 and second mounting pedestal 102. First mounting pedestal 101 and second mounting pedestal 102 are not coupled together but separate components. However, first mounting pedestal 101 and second mounting pedestal 102 may be coupled together. In addition, mounting pedestal 100 may be formed as not a coupled component but a single component.

As illustrated in FIG. 10 and FIG. 11, mounting pedestal 100 has a staircase shape. In addition, mounting pedestal 100 is curved on the whole. More specifically, first mounting pedestal 101 is formed like straight-line stairs, and second mounting pedestal 102 is formed like curved stairs. As illustrated in FIG. 6 to FIG. 10, first mounting pedestal 101 and second mounting pedestal 102 are arranged such that the foot of first mounting pedestal 101 and the head of second mounting pedestal 102 are overlapped.

First mounting pedestal 101 is a component mounting board for mounting light emitting element 200, and includes substrate 110, insulating layer 120 disposed on the surface of substrate 110, and interconnecting line 130 disposed on insulating layer 120, as illustrated in FIG. 13. In addition, as illustrated in FIG. 6 to FIG. 12, first mounting pedestal 101 further includes power supply terminal 140 electrically connected to interconnecting line 130.

It should be noted that second mounting pedestal 102 includes, in the same manner as first mounting pedestal 101, substrate 110, insulating layer 120 disposed on the surface of substrate 110, interconnecting line 130 disposed on insulating layer 120, and power supply terminal 140 electrically connected to interconnecting line 130.

In each of first mounting pedestal 101 and second mounting pedestal 102, substrate 110 includes a plurality of bending portions 111 at which substrate 110 is bent in a staircase shape. In other words, substrate 110 has a shape resulting from being bent multiple times as each of the plurality of bending portions 111 being a stair corner portion of the stair. More specifically, substrate 110 has a shape formed by alternately repeating mountain fold and valley fold multiple times. Accordingly, substrate 110 has: one face in which a mountain portion and a valley portion are alternately repeated as bending portions 111; and the other face which is opposite to the one face and in which a valley portion and a mountain portion are alternately repeated as bending portions 111. In other words, in each of the plurality of bending portions 111, the mountain portion and the valley portion of substrate 110 are disposed in a back-to-back manner.

According to the present embodiment, although bending angle θ of each of the plurality of bending portions 111 may be any one of: an acute angle; a right angle; and an obtuse angle, bending angle θ of each of the plurality of bending portions 111 is, for example, the obtuse angle as illustrated in FIG. 8, in terms of prevention of peel-off of interconnecting line 130 (circuit). In other words, bending angle θ may be greater than 90 degrees, for example. As one example, bending angle θ may be 90 degrees<θ<120 degrees.

Each of the plurality of bending portions 111 is bent so as to have a corner radius (R). In other words, in each of the plurality of bending portions 111, a corner R is formed in a mountain portion which is bent outwardly and a valley portion which is bent inwardly (i.e., a portion opposite to the mountain portion). According to the present embodiment, in each of the plurality of bending portions 111, the corner R of the mountain portion is greater than the corner R of the valley portion. As one example, in each of the plurality of bending portions 111, the value of a radius indicating the corner R of the mountain portion is 1 mm, and the value of a radius indicating the corner R of the valley portion is 2 mm. However, the present disclosure is not limited to this example.

In this manner, the corner R of the mountain portion is greater than the corner R of the valley portion in each of the plurality of bending portions 111, and thus it is possible to inhibit breaking of interconnecting line 130 even when interconnecting line 130 on substrate 110 is formed to extend across the plurality of bending portions 111.

In other words, when a heat generating component (light emitting element 200 in the present embodiment) is disposed on mounting pedestal 100, mounting pedestal 100 is thermally expanded due to a temperature rise caused by heat generated by the heat generating component when the heat generating component is in operation (e.g., when light emitting element 200 emits light), and on the other hand, mounting pedestal 100 is thermally contracted due to a temperature fall when the heat generating component is not in operation (e.g., when light emitting element 200 is turned off).

More specifically, substrate 110, insulating layer 120, interconnecting line 130, etc., included in mounting pedestal 100 are thermally expanded or thermally contracted. At this time, since substrate 110, insulating layer 120, interconnecting line 130, etc. have different linear expansion coefficients, there is a possibility of breaking of interconnecting line 130 due to a stress distortion caused by the differences between the linear expansion coefficients of these components. In particular, stress caused by the differences between the linear expansion coefficients greatly affects a portion in proximity to bending portions 111, and thus interconnecting line 130 is subject to breaking.

In view of the above, the corner R of the mountain portion is made greater than the corner R of the valley portion in each of the plurality of bending portions 111 as in the present embodiment, thereby making it possible to alleviate the stress to which interconnecting line 130 is subjected due to thermally expanding or thermally contracting of mounting pedestal 100. In this manner, it is possible to inhibit breaking of interconnecting line 130 even when interconnecting line 130 on substrate 110 is formed to extend across the plurality of bending portions 111.

In this case, it is preferable that bending angle θ of each of the plurality of bending portions 111 is greater than 90 degree. With this configuration, it is possible to further alleviate the stress to which interconnecting line 130 in bending portions 111 is subjected due to thermally expanding or thermally contracting of mounting pedestal 100. It is therefore possible to further inhibit breaking of interconnecting line 130.

In addition, as illustrated in FIG. 6 to FIG. 13, substrate 110 includes first planar portion 112 on which light emitting element 200 is disposed, and second planar portion 113 located adjacent to first planar portion 112 across one of the plurality of bending portions 111. Substrate 110 includes a plurality of first planar portions 112 and a plurality of second planar portions 113 which are alternately arranged with bending portion 111 being interposed therebetween, and thereby substrate 110 is bent in the staircase shape. In other words, substrate 110 of first mounting pedestal 101 and substrate 110 of second mounting pedestal 102 each include a plurality of first planar portions 112 and a plurality of second planar portions 113.

First planar portions 112 and second planar portions 113 are plate portions (flat portions) each having a planar shape in the respective substrates 110. In mounting pedestal 100 having the staircase shape, for example, first planar portions 112 each form a foot plate (stair tread) of a stair, and second planar portions 113 each form a riser plate of the stair. In this case, a main surface of each of first planar portions 112 forms a tread of the stair.

Each of the plurality of first planar portions 112 is a front planar portion of which a main surface faces in the direction of travel (front) of vehicle 1. According to the present embodiment as illustrated in FIG. 10 and FIG. 11, the normal line of the main surface of each of first planar portions 112 substantially matches the direction of travel (Y-axis direction) of vehicle 1.

As illustrated in FIG. 6 and FIG. 7, in substrate 110 of each of first mounting pedestal 101 and second mounting pedestal 102, each of the plurality of first planar portions 112 has a shape in which a tread length (i.e., a length of the depth of a tread) of the stair gradually narrows from one end to the other end in the width direction of the substrate (i.e., the tread width direction).

According to the present embodiment, shapes of the plurality of first planar portions 112 include a substantially trapezoid shape or a substantially sectoral shape, in which a width gradually narrows from one side to the other side in the vertical direction (the Z-axis directions). As illustrated in FIG. 6 and FIG. 7, the plurality of first planar portions 112 are radially arranged, when mounting pedestal 100 is viewed as a whole. In other words, in a plan view, the plurality of first planar portions 112 are arranged in an arched shape.

In this manner, the plurality of first planar portions 112 are arranged radially, thereby making it possible to enhance the heat dissipation performance of mounting pedestal 100. It should be noted that, although the plurality of first planar portions 112 all have shapes which differ from one another in a plan view according to the present embodiment, some of the plurality of first planar portions 112 may have the same shape.

Each of the plurality of second planar portions 113 is a side planar portion of which a main surface faces in the direction that crosses the direction of travel (front) of vehicle 1. The main surface of second planar portion 113 substantially faces the vertical direction. With this configuration, it is possible to effectively dissipate heat conducted from first planar portion 112 on which light emitting element 200 that is the heat source is disposed, to second planar portion 113, using chimney effect. It should be noted that, although the main surfaces of the plurality of second planar portions 113 face directions different from one another as illustrated in FIG. 6 to FIG. 9 according to the present embodiment, the present disclosure is not limited to this example.

As illustrated in FIG. 11, in substrate 110 of each of first mounting pedestal 101 and second mounting pedestal 102, each of the plurality of second planar portions 113 has a substantially rectangular shape in a plan view, and a rise (i.e., a height of one stair) is equivalent among the second planar portions 113. It should be noted that, although the plurality of second planar portions 113 in mounting pedestal 100 all have shapes which differ from one another in a plan view according to the present embodiment, some of the plurality of second planar portions 113 may have the same shape.

Figure 14:
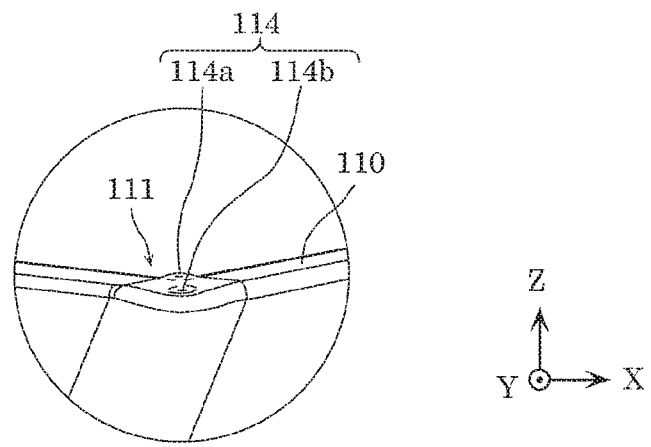
FIG. 14 is an enlarged front view (an enlarged view of region XIV enclosed by a dashed line indicated in FIG. 6) which illustrates a portion in proximity to a bending portion of a mounting pedestal of the light emitting module according to the embodiment.
Figure 15:
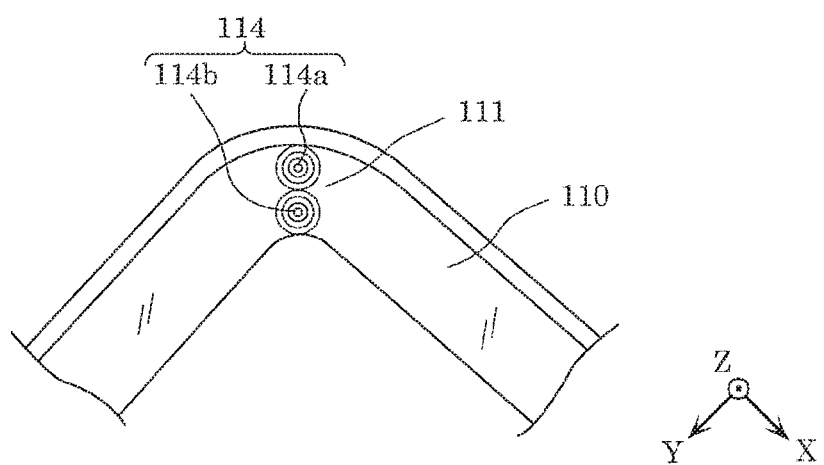
FIG. 15 is an enlarged top view (a top view of the portion in proximity to the bending portion indicated in FIG. 14) which illustrates the portion in proximity to the bending portion of the mounting pedestal of the light emitting module according to the embodiment.

In addition, as illustrated in FIG. 14 and FIG. 15, substrates 110 each have uneven portion 114 formed on a side face thereof. According to the present embodiment, uneven portion 114 is formed on each of the side faces of substrate 110. FIG. 14 is a diagram which illustrates an enlarged front view of a portion in proximity to bending portion 111 in mounting pedestal 100, and shows an enlarged view of region XIV enclosed by a dashed line indicated in FIG. 6. FIG. 15 is a diagram which illustrates an enlarged top view of a portion in proximity to bending portion 111 in mounting pedestal 100, and is a top view of the portion in proximity to the bending portion illustrated in FIG. 14.

As illustrated in FIG. 14 and FIG. 15, uneven portion 114 includes protrusion 114a and/or depression 114b. Uneven portion 114 has minute unevenness in which the height of protrusion 114a and the depth of depression 114b are each less than or equal to the thickness of substrate 110, for example. Such uneven portion 114 can be formed by press working when changing the shape of substrate 110 into a staircase shape, for example.

As described above, by forming uneven portion 114 on the side face of substrate 110, it is possible to enlarge the surface area of the side face of substrate 110 compared to the case where the side face of substrate 110 is flat. With this configuration, it is possible to use uneven portion 114 as a heat dissipation structure, enabling an increase in a cooling effect on the side face of substrate 110. Accordingly, it is possible to enhance the heat dissipation performance of mounting pedestal 100.

In addition, according to the present embodiment, uneven portion 114 is formed on the side face of substrate 110, in each of the plurality of bending portions 111. More specifically, uneven portion 114 protrudes in the mountain-side region on the side face of each bending portion 111, and is depressed in the valley-side region on the side face of each bending portion 111. More specifically, uneven portion 114 in each of the plurality of bending portions 111 includes one protrusion 114a formed to have a mountain shape in the mountain-side region on the side face of substrate 110, and one depression 114b formed to have a valley shape in the valley-side region of the side face of substrate 110. Protrusion 114a is a projection which is raised in a substantially conical shape with a rounded top. Depression 114b is a dent which is dented in a substantially conical shape with a rounded bottom.

With this configuration, it, is possible to inhibit heat generated from light emitting element 200 mounted on first planar portion 112 from causing adverse effects on light emitting element 200 mounted on the adjacent first planar portion 112.

It should be noted that, on the side face of substrate 110 in each of the plurality of bending portions 111, the total number of each of protrusion 114a and depression 114b is not limited to one, but a plurality of protrusions 114a and a plurality of depression 114b may be formed.

In this case, as described above, first planar portion 112 has a shape in which a tread length gradually narrows from one end to the other end in the width direction of the substrate, and the density of protrusions and depressions of uneven portion 114 on the side face of the other end of first planar portion 112 may be higher than the density of protrusions and depressions of uneven portion 114 on the side face of the one end of first planar portion 112. In other words, in first planar portion 112, the density of protrusions and depressions of uneven portion 114 may be higher on the side face of the end portion having a shorter tread length of first planar portion 112 than on the side face of the end portion having a longer tread length of first planar portion 112. The density of protrusions and depressions is a ratio of protrusion 114a or depression 114b per unit area.

With this configuration, it is possible to facilitate heat dissipation in an upper portion in the vertical direction of substrate 110 where the temperature is likely to increase due to chimney effects.

Figure 16:
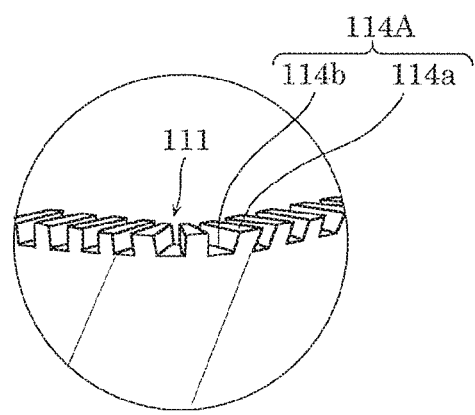
FIG. 16 is a partially enlarged perspective view of a light emitting module according to Variation 1.

It should be noted that, although uneven portion 114 in which protrusion 114a and depression 114b are alternately arranged in the thickness direction of substrate 110 is illustrated as an example in FIG. 14 and FIG. 15, the present disclosure is not limited to this example. For example, as in uneven portion 114A illustrated in FIG. 16, protrusion 114a and depression 114b may be alternately arranged in the longitudinal direction of substrate 110. In this case, although uneven portion 114A may have minute unevenness in which the height of protrusion 114a and the depth of depression 114b are each less than or equal to the thickness of substrate 110, the present discloser is not limited to this example, and the height of protrusion 114a and the depth of depression 114b may be greater than or equal to the thickness of substrate 110. Such uneven portion 114A can be formed by applying end face processing such as cutting work after press working.

Alternatively, instead of separately performing cutting work or the like, burr that is generated on the side face of substrate 110 when, for example, cutting a metal plate into a predetermined shape or processing a metal plate into a staircase shape, may be saved and used as the uneven portion.

In addition, although uneven portion 114 is formed in each of the plurality of bending portions 111 on each of the side faces in the width direction of substrate 110 according to the present embodiment, the present disclosure is not limited to this example. Uneven portion 114 may be formed on only one of the side faces in the width direction of substrate 110. In addition, although uneven portion 114 may be formed on the side faces of substrate 110 in each of the all of bending portions 111, the present disclosure is not limited to this example. In addition, uneven portion 114 may be formed on the side faces of substrate 110 other than bending portions 111. For example, uneven portion 114 may be formed on the side faces of substrate 110 in first planar portion 112 and/or second planar portion 113. For example, uneven portion 114 may be formed in the entirety of the both side faces of substrate 110.

Substrate 110 configured in such a manner is formed using a metal plate including an aluminum alloy, an iron alloy, or the like, and can be bent in a staircase shape by performing press working on a flat metal plate (for example, an aluminum plate, a steel plate, or the like) which is cut into a predetermined shape. In this case, when performing the press working on the flat metal plate, it is possible to manufacture substrate 110 having a staircase shape, by using, for example, an upper mold and a lower mold each having a staircase shape. It should be noted that the thickness of substrate 110 is, for example, approximately 1 mm to 5 mm. According to the present embodiment, substrate 110 has a thickness of 3 mm.

In substrate 110 after the press working, the surface of at least a portion of the mountain portion of each of the plurality of bending portions 111 may be rougher than the surface of each of first planar portion 112 and second planar portion 113. In other words, a surface roughness Ra of the surface of at least a portion of the mountain portion of each of the plurality of bending portions 111 may be greater than a surface roughness Ra of the surface of each of first planar portion 112 and second planar portion 113.

With this configuration, it is possible to inhibit occurrence of film stripping or film floating of insulating layer 120 in each of the plurality of bending portions 111. In other words, although film stripping of insulating layer 120 is more likely to occur in bending portion 111 compared to first planar portion 112 and second planar portion 113, it is possible to improve the adhesion of insulating layer 120 formed on the mountain portion of bending portion 111, by roughening the surface of at least a portion of the mountain portion of bending portion 111 to have a greater roughness than the surface of each of first planar portion 112 and second planar portion 113. With this configuration, it is possible to inhibit occurrence of film stripping or the like of insulating layer 120 in bending portion 111. As a result, it is also possible to inhibit defects such as breaking of interconnecting line 130 due to film stripping or the like of insulating layer 120.

In addition, in each of the plurality of bending portions 111, the surface roughness Ra of a portion in proximity to the edge of the mountain portion may be greater than the surface roughness Ra of at least a portion other than the portion in proximity to the edge of the mountain portion.

Although film stripping of insulating layer 120 is more likely to occur in the portion in proximity to the edge of the mountain portion of bending portion 111 than in the other portions, it is possible to improve the adhesion in the portion in proximity to the edge of the mountain portion of bending portion 111 in which film stripping of insulating layer 120 is likely to occur, by causing the portion in proximity to the edge of the mountain portion of bending portion 111 to have a surface roughness Ra greater than a surface roughness Ra of the other portions. With this configuration, it is possible to effectively inhibit occurrence of film stripping of insulating layer 120 in each of the plurality of bending portions 111.

In addition, first planar portion 112 has a shape in which a tread length gradually narrows from one end to the other end in the width direction of the substrate as described above. In this case, an average value of the surface roughness in a narrow region (a first region) close to the other end (the end portion side having a shorter tread length) of first planar portion 112 may be higher than an average value of the surface roughness in a wide region (a second region) close to the one end (the end portion side having a longer tread length) of first planar portion 112.

With this configuration, it is possible to easily apply insulating layer 120 even when first planar portion 112 includes a narrow region. More specifically, although it is difficult to apply insulating layer 120 on the narrow region of first planar portion 112, which is on the end portion side having a shorter tread length, due to its narrowness, it is possible to easily form insulating layer 120 by applying insulating layer 120 to the narrow region on which it is usually difficult to apply insulating layer 120, by causing the narrow region to have an average value of the surface roughness greater than an average value of the surface roughness of the wide region. In other words, it is possible to enhance the reliability in applying insulating layer 120.

The following describes insulating layer 120 formed on substrate 110. As illustrated in FIG. 13, insulating layer 120 is formed to be in contact with the surface of substrate 110. More specifically, insulating layer 120 is formed to cover the entirety of the main surface (element mount surface) of substrate 110 having a staircase shape, on the side on which light emitting element 200 is disposed. In other words, insulating layer 120 is formed into a staircase shape along the shape of substrate 110 having the staircase shape, to cover the entirety of one of the surfaces of each of bending portion 111, first planar portion 112, and second planar portion 113. It should be noted that insulating layer 120 may be formed to further cover the entirety of the main surface of substrate 110 on the side opposite to the main surface on which the light emitting element is disposed, or may be formed to cover the entirety of the side faces of substrate 110.

Insulating layer 120 is an insulating film including a resin material having insulation properties. It is possible to insulate substrate 110 formed of a metal plate from interconnecting line 130 which is electrically conductive, by covering substrate 110 with insulating layer 120.

Insulating layer 120 includes a white resin material in which, for example, a white pigment (titania, silica, etc.) is contained in a resin material such as an epoxide-based resin, an urethane-based resin, or the like. As described above, use of white insulating layer 120 makes it possible to cause the surface of mounting pedestal 100 to have a high reflectance. With this configuration, when light emitted from light emitting element 200 returns to substrate 110, it is possible to cause the light returning to substrate 110 to be reflected by insulating layer 120. Accordingly, it is possible to improve the light extraction efficiency of light emitting module 10.

According to the present embodiment, insulating layer 120 is formed substrate 110 after substrate 110 is bent in a staircase shape. More specifically, after performing press working on a metal plate to form substrate 110 having a staircase shape, a coating material is applied to one of the main faces of substrate 110 having the staircase shape and cured, thereby making it possible to form insulating layer 120 formed of a coated film.

The following describes interconnecting line 130 formed on insulating layer 120. Interconnecting line 130 is a power supply line for supplying, to light emitting element 200 mounted on substrate 110, power for causing light emitting element 200 to emit light. More specifically, interconnecting line 130 connects light emitting element 200 and power supply terminal 140.

Interconnecting line 130 is formed on the surface of insulating layer 120 into a predetermined pattern. Interconnecting line 130 is, for example, a metal line including a metal material such as copper (Cu), silver (Ag), or the like. Interconnecting line 130 may be formed into a predetermined shape through printing or the like, or by etching a portion of a metal film (e.g., copper foil) formed on the entire surface of substrate 110. Alternatively, interconnecting line 130 may be a metal line obtained by performing gold plating using copper or silver as a base metal. According to the present embodiment, interconnecting line 130 is a plated line (Cu/Ni/Au) which is nickel-plated, as a base of gold plating, using copper as a base metal.

Interconnecting line 130 is formed to be in contact with the surface of insulating layer 120. More specifically, interconnecting line 130 is formed on insulating layer 120 that is formed along the shape of substrate 110 having a staircase shape, and thus interconnecting line 130 is formed into a staircase shape along the shape of substrate 110 having the staircase shape. Accordingly, interconnecting line 130 is formed to extend across a plurality of bending portions 111. More specifically, interconnecting line 130 is formed across each of bending portion 111, first planar portion 112, and second planar portion 113. In other words, interconnecting line 130 has a three-dimensional wiring pattern.

As illustrated in FIG. 8, interconnecting line 130 includes first line portion 131 formed on first planar portion 112 and second line portion 132 formed on second planar portion 113.

According to the present embodiment, first line portion 131 is slanted with respect to an edge of the mountain portion of bending portion 111. In other words, first line portion 131 is formed, from a valley portion of one of two adjacent bending portions 111 to a mountain portion of the other of the two adjacent bending portions 111, to be slanted with respect to the edge of the mountain portion.

In this manner, by forming first line portion 131 so as to be slanted with respect to the edge of the mountain portion of bending portion 111, it is possible to enlarge the corner R of the corner portion directly beneath interconnecting line 130 in bending portion 111. With this configuration, it is possible to further alleviate the stress to which interconnecting line 130 in bending portions 111 is subjected due to thermally expanding or thermally contracting of mounting pedestal 100. It is therefore possible to further inhibit breaking of interconnecting line 130.

In contrast, second line portion 132 is formed be perpendicular to the edge of the valley portion of bending portion 111. In other words, second line portion 132 is formed, from a mountain portion of one of two adjacent bending portions 111 to a valley portion of the other of the two adjacent bending portions 111, to be perpendicular to the edge of the valley portion.

Figure 17:
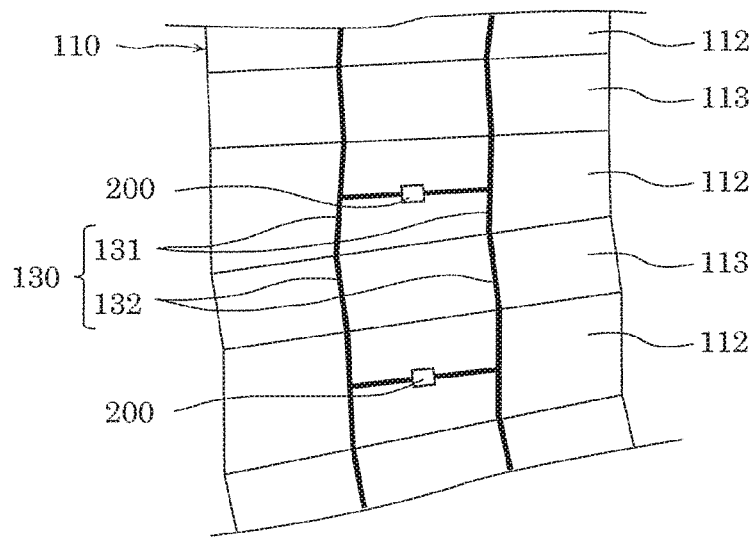
FIG. 17 is a diagram of a partially unfolded portion of the light emitting module according to an embodiment.

When first line portion 131 and second line portion 132 formed in such patterns are placed into a planar shape by unfolding first planar portion 112 and second planar portion 113, first line portion 131 and second line portion 132 form a polygonal line shape in a plan view as illustrated in FIG. 17.

Figure 18:
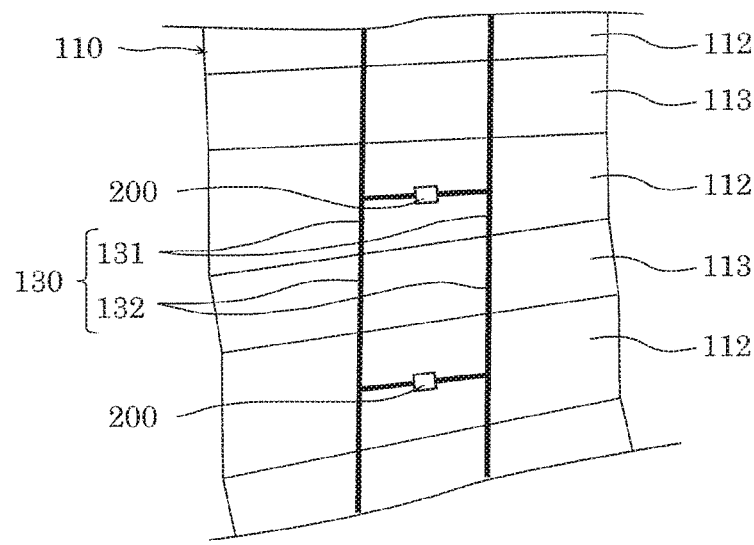
FIG. 18 is a diagram of a partially unfolded portion of a light emitting module according to Variation 2.

It should be noted that wiring layout of first line portion 131 and second line portion 132 are not limited to the example illustrated in FIG. 17. For example, As illustrated in FIG. 18, when first planar portion 112 and second planar portion 113 are unfolded in a planar shape, first line portion 131 and second line portion 132 may form a straight line. In this case, when first planar portion 112 and second planar portion 113 are formed into a staircase shape, first line portion 131 is formed to be slanted with respect to the edge of the mountain portion of bending portion 111. In addition, second line portion 132 is also formed to be slanted with, respect to the edge of the valley portion of bending portion 111.

In this manner, by forming interconnecting line 130 such that first line portion 131 and second line portion 132 form a straight line when first planar portion 112 and second planar portion 113 are unfolded in a planar shape, it is possible to shorten the length of interconnecting line 130 so as to lower the resistivity of interconnecting line 130. With this configuration, it is possible to implement light emitting module 10 which is highly efficient even when mounting pedestal 100 has an elongated shape.

It should be noted that FIG. 1.7 and FIG. 18 each illustrate only a major portion of interconnecting line 130, and thus does not strictly match the pattern of interconnecting line 130 illustrated in other diagrams.

The following describes power supply terminal 140. Power supply terminal 140 is an external connecting terminal for receiving predetermined power from a power supply device, etc., outside of light emitting module 10. According to the present embodiment, light emitting elements 200 are LED elements, and thus power supply terminal 140 receives DC power for causing light emitting elements 200 to emit light, and supplies the received DC power to each of light emitting elements 200 via interconnecting line 130.

According to the present embodiment, power supply terminal 140 is a connector terminal, and includes a connector body made of insulating resin and a plurality of conductive terminal (conductive pin) which has conductive properties. A connector line for power supply (power supply line) is connected to power supply terminal 140. It should be noted that power supply terminal 140 may be a metal electrode or a quick connection terminal.

According to the present embodiment, in substrate 110 of each of first mounting pedestal 101 and second mounting pedestal 102, power supply terminal 140 is disposed on one of the foot and the head of substrate 110 which has a staircase shape. In other words, power supply terminal 140 is disposed on only one of the end portions of substrate 110 in a longitudinal direction.

With this configuration, it is possible to simplify the pattern of interconnecting line 130. Accordingly, it is possible to further inhibit breaking of interconnecting line 130.

In addition, among the plurality of first planar portions 112, first planar portion 112 on which power supply terminal 140 is disposed is first planar portion 112 which corresponds to the foot or the head of substrate 110 having a staircase shape, and is an extended portion which has a tread length greater than tread lengths of the other first planar portions 112. Power supply terminal 140 is disposed on first planar portion 112 which is the extended portion.

In this manner, by mounting power supply terminal 140 on first planar portion 112 (extended portion) which corresponds to the foot or the head of substrate 110, it is possible to effectively use a surplus portion of mounting pedestal 100.

(Light Emitting Element)

Light emitting element 200 is a light emitter which serves as a light source of light emitting module 10. Light emitting element 200 is one example of the heat generating component, and generates heat by emitting light.

Light emitting element 200 is disposed on mounting pedestal 100. As illustrated in FIG. 13, light emitting element 200 is disposed on substrate 110 on which insulating layer 120 and interconnecting line 130 are formed, and is electrically connected to interconnecting line 130.

As illustrated in FIG. 8, light emitting element 200 is disposed on first planar portion 112 of substrate 110. According to the present embodiment, light emitting element 200 in mounted only on first planar portion 112 among first planar portion 112 and second planar portion 113, and is not mounted on second planar portion 113. In addition, as illustrated in FIG. 6, light emitting element 200 is disposed on each of first planar portions 112, other than first planar portion 112 which corresponds to a landing (turned back portion) of a curved stairs.

The optical axis of light emitting element 200 mounted on first planar portion 112 substantially matches the forward (Y-axes direction). In other words, light emitting element 200 emits light toward the direction of travel of vehicle 1.

As illustrated in FIG. 6, a plurality of light emitting elements 200 included in mounting pedestal 100 are each mounted at a substantially center portion of each of first planar portions 112, and are aligned along a curved shape of mounting pedestal 100. In other words, the plurality of light emitting elements 200 are arranged in a curved line.

Each of light emitting elements 200 is an SMD LED element in which an LED chip is packaged, and includes white package 210 which is made of resin or ceramic and has a depression, one or more LED chips 220 primarily mounted on a bottom surface of the depression of package 210, and sealing component 230 sealed in the depression of package 210. Sealing component 230 includes a light-transmissive resin material such as a silicone resin, for example. Sealing component 230 may be a phosphor-containing resin which contains a wavelength-converter material such as a phosphor.

LED chip 220 is one example of a semiconductor light emitting element which emits light with use of a predetermined DC power, and is a bare chip which emits visible light of a monochromatic color. LED chip 220 is a blue LED chip which emits blue light when current is supplied, for example. In this case, sealing component 230 contains a yellow phosphor such as yttrium aluminum garnet (YAG) which emits fluorescent light using blue light emitted by a blue LED chip as excitation light.

As described above, light emitting element 200 according to the present embodiment is a BY-type white LED light source including the blue LED chip and the yellow phosphor. More specifically, the yellow phosphor is excited by absorbing a portion of blue light emitted by blue LED chip 220 to emit yellow light, and the yellow light and a portion of the blue light which is not absorbed by the yellow phosphor is mixed to be white light. It should be noted that sealing component 230 may include not only the yellow phosphor but also a red phosphor or a green phosphor.

(Light Distribution Control Component)

Light distribution control component 300 is an optical system for controlling light distribution of light emitting element 200. As illustrated in FIG. 2 to FIG. 6, light distribution control component 300 is disposed on each of the stairs of substrate 110 of mounting pedestal 100. More specifically, light distribution control component 300 is disposed on each of first planar portions 112 of mounting pedestal 100. In other words, a plurality of light distribution control components 300 are disposed on mounting pedestal 100 in a one-to-one relationship with first planar portions 112.

Figure 19:
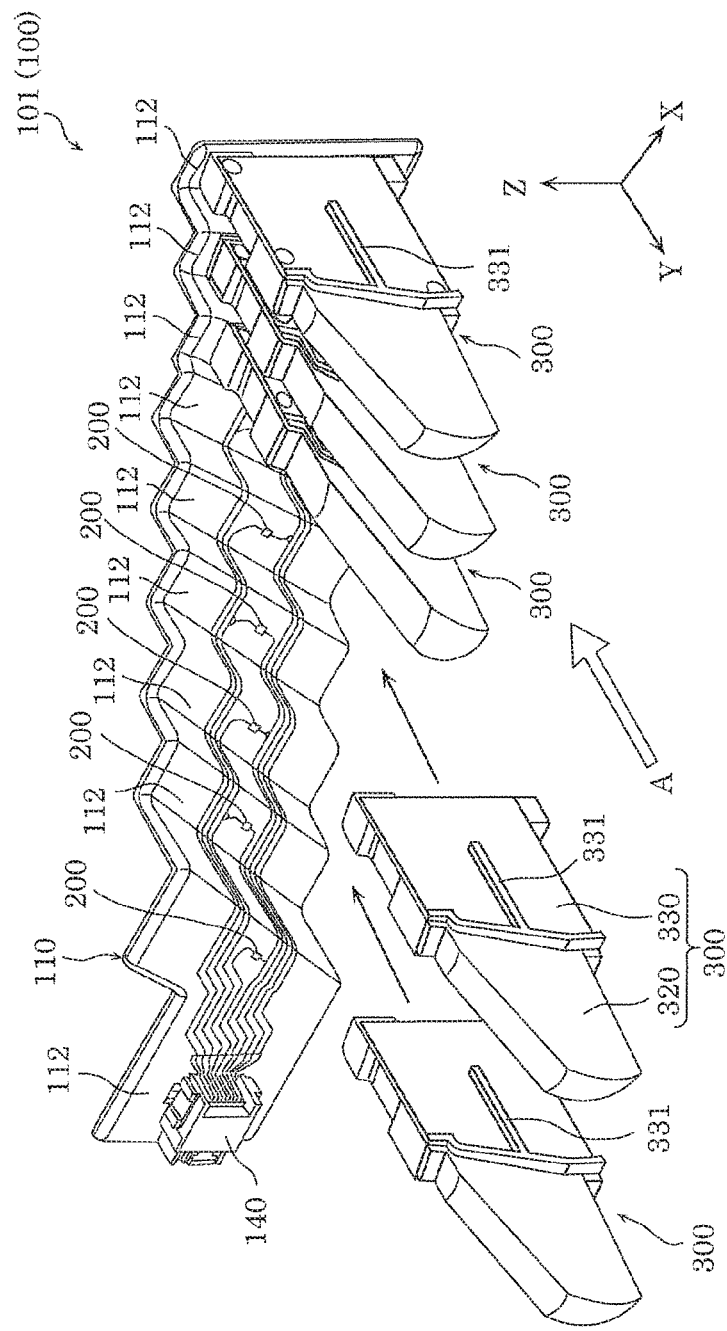
FIG. 19 is a partially exploded perspective view of a first mounting pedestal of the light emitting module according to the embodiment.
Figure 20:
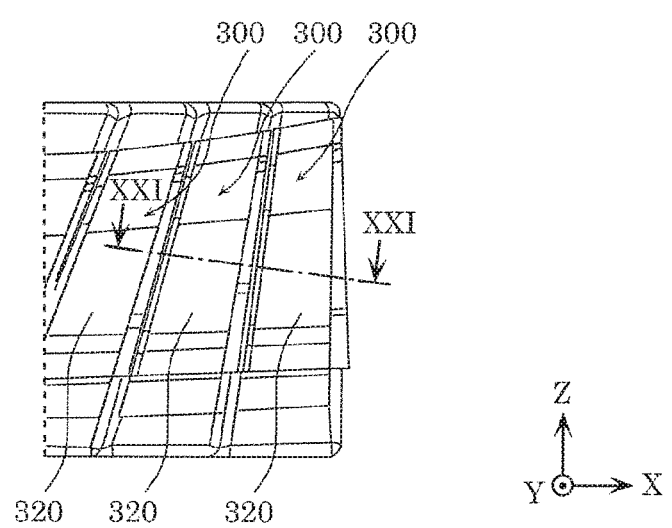
FIG. 20 is a front view which illustrates the light emitting module according to the embodiment, when viewed in the direction of arrow A indicated in FIG. 19.
Figure 21:
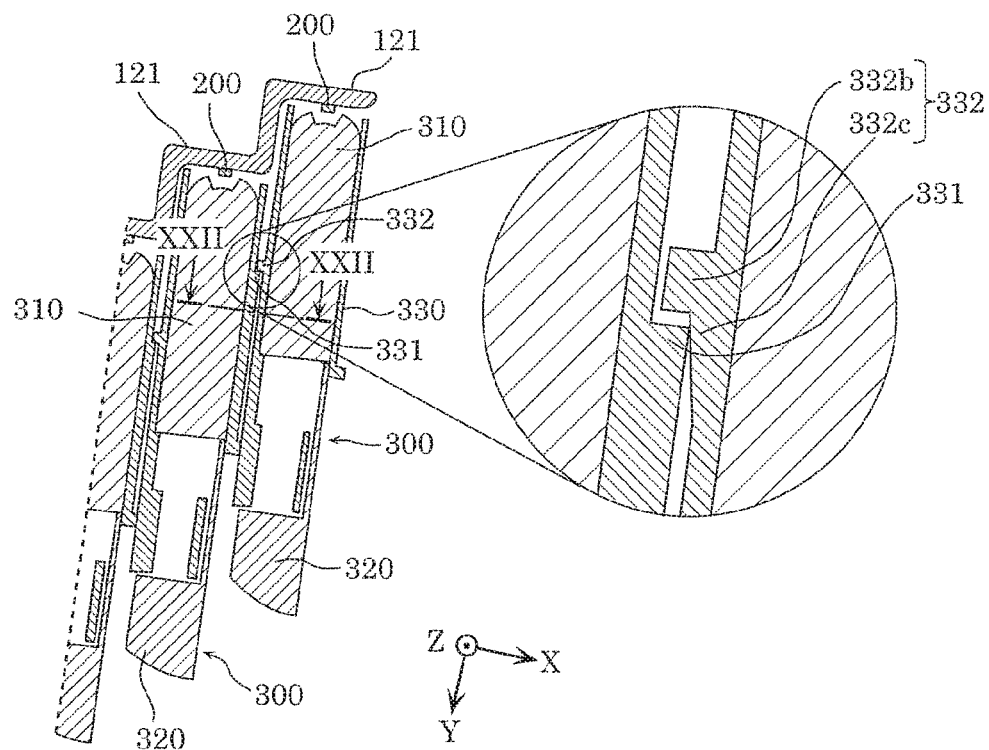
FIG. 21 is a cross sectional view which illustrates the light emitting module according to the embodiment, taken along the line XXI-XXI indicated in FIG. 20.
Figure 22:
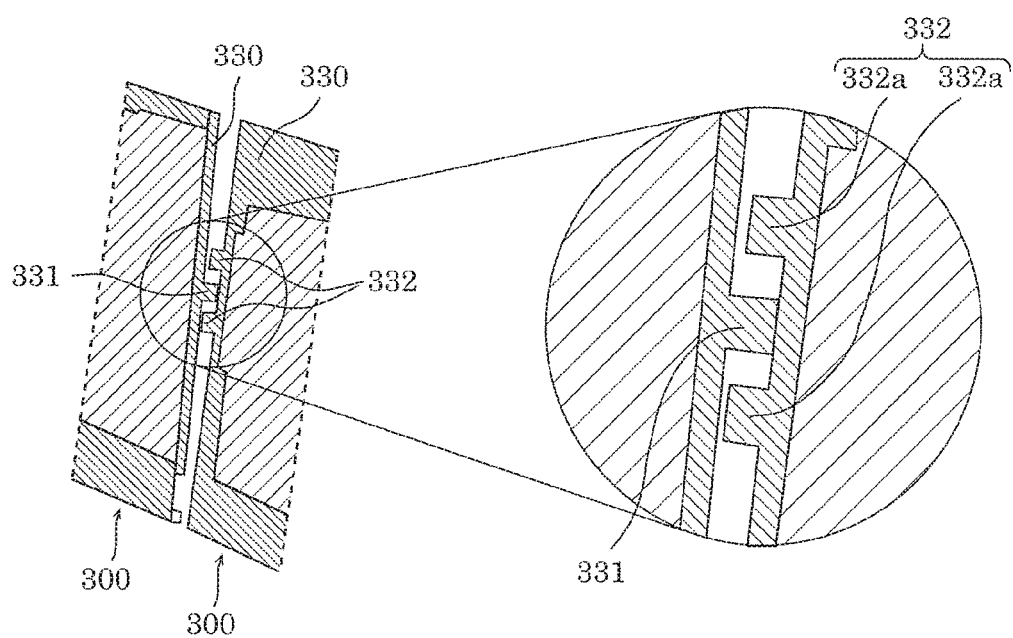
FIG. 22 is a cross sectional view which illustrates the light emitting module according to the embodiment, taken along the line XXII-XXII indicated in FIG. 21.
Figure 23:
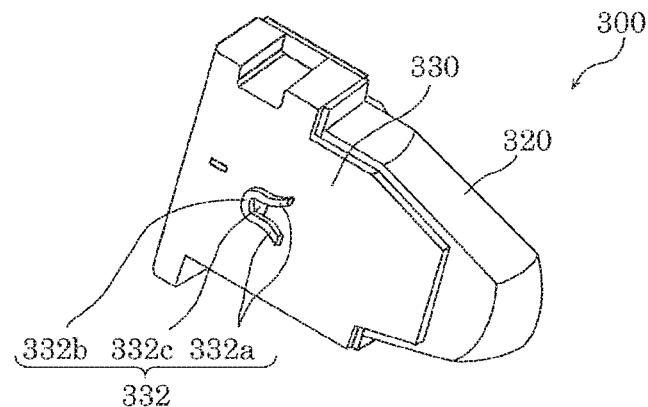
FIG. 23 is a perspective view which illustrates the light distribution control component of the light emitting module according to the embodiment.

Here, light distribution control component 300 will be described with reference to FIG. 19 to FIG. 23. FIG. 19 is a perspective view which illustrates first mounting pedestal 101 of light emitting module 10 according to the embodiment, when first mounting pedestal 101 is partially exploded. FIG. 20 is a front view of the above-described light emitting module 10 when viewed in the direction of arrow A indicated in FIG. 19. FIG. 21 is a cross-sectional view of the above-described light emitting module 10 taken along the line XXI-XXI indicated in FIG. 20. FIG. 22 is a cross-sectional view of the above-described light emitting module 10 taken along the line XXII-XXII indicated in FIG. 21. FIG. 23 is a perspective view of light distribution control component 300 included in the above-described light emitting module 10. It should be noted that, although first mounting pedestal 101 will be described hereinafter, the same description also applies to second mounting pedestal 102.

As illustrated in FIG. 19 to FIG. 23, light distribution control components 300 each include first lens 310, second lens 320 (see FIG. 21), and lens barrel 330. Light distribution control component 300 includes first lens 310, second lens 320, and lens barrel 330 which are integrally combined, and is fixed to first mounting pedestal 101 so as to cover light emitting element 200.

As illustrated in FIG. 21, first lens 310 and second lens 320 are optical components arranged in the light emitting direction of light emitting element 200. In each of light distribution control components 300, first lens 310 and second lens 320 are aligned in the light emitting direction of light emitting element 200.

First lens 310 is a collimate lens for collimating light emitted by light emitting element 200. First lens 310 is disposed between light emitting element 200 and second lens 320.

Second lens 320 is disposed in front of first lens 310. Second lens 320 collects or diffuses light which exits through first lens 310, and distributes the light in a predetermined direction. More specifically, second lens 320 is a transparent lens having a plate shape, and protrudes from an opening portion on a front side of lens barrel 330.

Lens barrel 330 is a holder which holds first lens 310 and second lens 320. Lens barrel 330 has a flat box shape having an opening portion on each end. First lens 310 is disposed inside lens barrel 330, and second lens 320 is disposed to cover the opening portion on the front side of lens barrel 330.

As illustrated in FIG. 19 and FIG. 21, in each of light distribution control components 300, lens barrel 330 and first planar portion 112 are arranged in a one-to-one relationship. In other words, lens barrel 330 is disposed on each of the stairs of substrate 110. Lens barrel 330 has an opening portion on a back side thereof, and the opening portion on the back side encloses light emitting element 200.

According to the present embodiment, first lens 310, second lens 320, and lens barrel 330 include a resin material such as an acrylic resin, a polycarbonate resin, or the like, and are mutually joined by laser welding. In addition, first lens 310 and second lens 320 are formed using a transparent resin, and lens barrel 330 is formed using a black resin. Lens barrel 330 is fixed to first planar portion 112 by a screw or the like, and thereby light distribution control component 300 is fixed to first planar portion 112.

Here, one of a plurality of lens barrels 330 includes first contact portion 331 which is in contact with another of the plurality of lens barrels 330 adjacent to the one of the plurality of lens barrels 330. According to the present embodiment, each of the plurality of lens barrels 330 has, as first contact portion 331 which is in contact with adjacent one of the plurality of lens barrels 330, a protrusion that protrudes toward the adjacent one of the plurality of lens barrels 330. The protrusion at least restricts approach of one of a plurality of lens barrels 330 and another of the plurality of lens barrels 330 adjacent to the one of the plurality of lens barrels 330. According to the present embodiment, first contact portion 331 is an elongated linear protrusion (standing wall) which extends in the Y-axis direction, and is formed on one of the side faces of each of lens barrels 330.

As described above, one of a plurality of lens barrels 330 includes first contact portion 331 which is in contact with another of the plurality of lens barrels 330 adjacent to the one of the plurality of lens barrels 330. This structure makes it possible to prevent lens barrel 330 from being damaged by contacting with another adjacent lens barrel 330 at an expected position.

In addition, another of the plurality of lens barrels 330 adjacent to the one of the plurality of lens barrels 330 has, as second contact portion 332 which is in contact with first contact portion 331, a receiver for receiving the protrusion (first contact portion 331) of the one of the plurality of lens barrels 330.

According to the present embodiment, second contact portion 332 (receiver) of one of the plurality of lens barrels 330 has a pair of upper and lower ribs 332a, rear rib 332b, and sloped portion 332c, as illustrated in FIG. 23.

In one of the plurality of lens barrels 330, a pair of upper and lower ribs 332a restrict vertical movement of first contact portion 331 of another of the plurality of lens barrels 330 adjacent to the one of the plurality of lens barrels 330. The pair of upper and lower ribs 332a is configured so as to interpose therebetween first contact portion 331 which is an elongated protrusion. In other words, the pair of upper and lower ribs 332a close at least upper and lower portions of first contact portion 331 when viewed from the side face in the direction of travel of vehicle 1. In addition, the pair of upper and lower ribs 332a has a receiving opening portion which opens upwardly and downwardly so as to facilitate inserting of first contact portion 331. It should be noted that, according to the present embodiment, the pair of upper and lower ribs 332a have a fixed height.

Rear rib 332b is positioned on the side opposite to the receiving opening portion of the pair of upper and lower ribs 332a. Rear rib 332b closes a rear side of the pair of upper and lower ribs 332a. According to the present embodiment, rear rib 332b and the pair of upper and lower ribs 332a are integrally formed as a continuous elongated protrusion.

Sloped portion 332c is positioned between the receiving opening portion of the pair of upper and lower ribs 332a and rear rib 332b. Sloped portion 332c is sloped upwardly from the receiving opening portion of the pair of upper toward lower ribs 332a toward rear rib 332b. Sloped portion 332c has, for example, a cuneate shape of which the shape of a cross-section surface is a right-angled triangle. It should be noted that the maximum height of sloped portion 332c is lower than the height of upper and lower ribs 332a.

Second contact portion 332 which has the above-described configuration is formed on the other of the side faces of each of lens barrels 330. First contact portion 331 of one of the plurality of lens barrels 330 is inserted to second contact portion 332 of the other of the plurality of lens barrels 330, and thereby the adjacent lens barrels 330 are fit together. More specifically, two of the plurality of lens barrels 330 which are adjacent to each other are mutually fixed by clamping force generated when first contact portion 331 of the other of the plurality of lens barrels 330 is inserted and pressed into second contact portion 332 of the one of the plurality of lens barrels 330.

First contact portion 331 and second contact portion 332 are formed on each of the plurality of lens barrels 330. According to the present embodiment, first contact portion 331 and second contact portion 332 are formed on at least each of the plurality of lens barrels 330 which are arranged in a stacking manner. More specifically, in each of the plurality of lens barrels 330, first contact portion 331 is formed on one of the side faces, and second contact portion 332 is formed on the other of the side faces which is opposite to the one of the side faces.

When light distribution control components 300 configured in this manner are disposed on mounting pedestal 100 (first mounting pedestal 101), light distribution control components 300 are sequentially disposed one by one from one side to the other in the X-axis direction as illustrated in FIG. 19.

More specifically, when light distribution control components 300 are disposed on first mounting pedestal 101, first contact portion 331 (protrusion) of lens barrel 330 of light distribution control component 300 which is disposed subsequently is inserted to second contact portion 332 (receiver) of lens barrel 330 of light distribution control component 300 previously disposed on first mounting pedestal 101.

At this time, as illustrated in FIG. 21, light distribution control component 300 (lens barrel 330) subsequently disposed is fixed to mounting pedestal 100 in such a manner that first contact portion 331 (protrusion) is pressed between light distribution control component 300 subsequently disposed and adjacent lens barrel 330 previously disposed. In this manner, two light distribution control components 300 (lens barrels 330) which are adjacent to each other are clamped and fixed, and it is thus possible to inhibit shifting of light distribution control component 300 from a predetermined position due to vibration or the like. Accordingly, it is possible to inhibit deterioration of light distribution characteristics of light emitting module 10 resulting from deviation of an optical axis, etc., due to positional shifting of light distribution control component 300.

In addition, since first contact portion 331 and second contact portion 332 are formed on each of the plurality of lens barrels 330 according to the present embodiment, when the plurality of light distribution control components 300 are disposed, light distribution control components 300 can be disposed on first mounting pedestal 101 only in a predetermined order in a unilateral direction.

Figure 24:
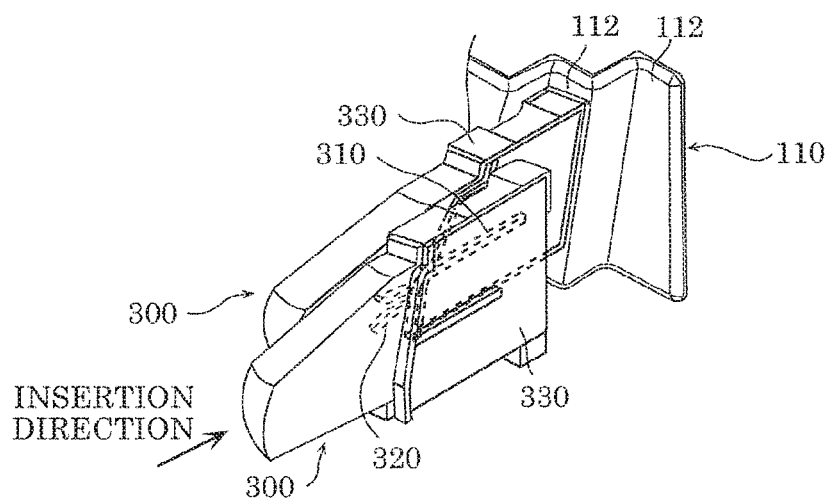
FIG. 24 is a diagram which illustrates the state in which the light distribution control component is assembled in a correct assembling order in the light emitting module according to the embodiment.

For example, if light distribution control components 300 are to be disposed in the order reverse to the predetermined order, when first contact portion 331 of lens barrel 330 of light distribution control component 300 which is previously disposed is inserted to second contact portion 332 of lens barrel 330 of light distribution control component 300 which is subsequently disposed, first contact portion 331 of light distribution control component 300 (lens barrel 330) which is subsequently disposed comes in contact with rear rib 332b of second contact portion 332 of light distribution control component 300 (lens barrel 330) which is previously disposed, as illustrated in FIG. 24. For that reason, it is not possible to insert lens barrel 330 of light distribution control component 300 which is subsequently disposed into lens barrel 330 of light distribution control component 300 which is previously disposed. In this manner, it is possible to notice that light distribution control component 300 is about to be fixed to an incorrect position.

Figure 25:
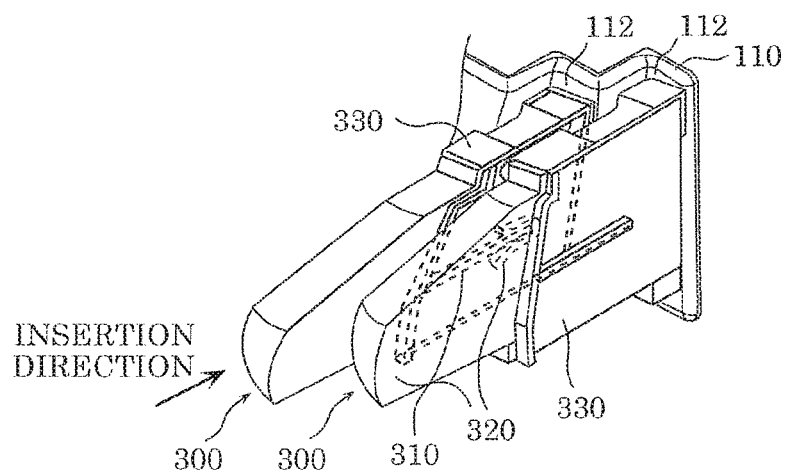
FIG. 25 is a diagram which illustrates the state in which the light distribution control component is assembled in an incorrect assembling order in the light emitting module according to the embodiment.

As described above, by using light distribution control component 300 according to the present embodiment, light distribution control components 300 can be disposed on mounting pedestal 100 only in the predetermined order in a unilateral direction. Accordingly, as illustrated in FIG. 25, each of light distribution control components 300 can be easily disposed on first planar portion 112 which properly corresponds to light distribution control component 300. In this manner, it is possible to avoid incorrect attachment of light distribution control component 300, making it possible to prevent an error in assembling order of light distribution control component 300 (lens barrel 330).

It should be noted that, although the shape of first contact portion 331 of lens barrel 330 is the same among light distribution control components 300 according to the present embodiment, the present disclosure is not limited to this example. In other words, the shape of first contact portion 331 of lens barrel 330 may be different for different light distribution control components 300. With this configuration, it is possible to further present an error in assembling order of light distribution control component 300 (lens barrel 330).

In addition, although second contact portion 332 of lens barrel 330 illustrated in FIG. 23 is employed according to the present embodiment, the present disclosure is not limited to this example.

Figure 26A:
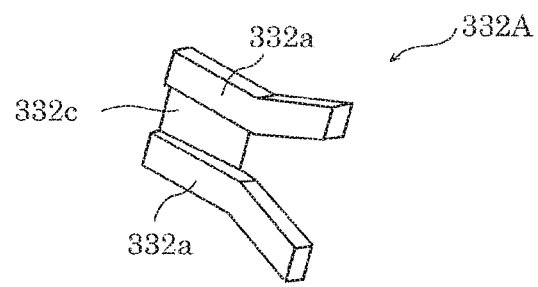
FIG. 26A is a diagram which illustrates a configuration of a second contact portion of a lens barrel of a light distribution control component according to Variation 1.

For example, as illustrated in FIG. 26A, a configuration of second contact portion 332A resulting from deleting rear rib 332b from second contact portion 332 illustrated in FIG. 23 may be employed. In this case, a wall portion on the rear end of sloped portion 332c serves as rear rib 332b.

Figure 26B:
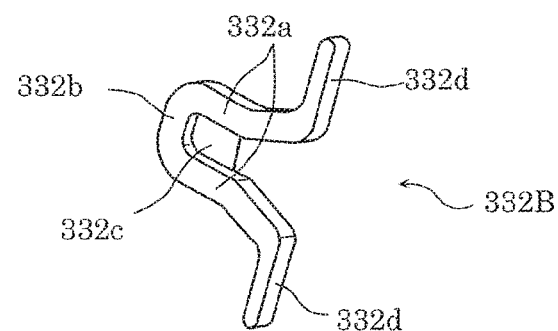
FIG. 26B is a diagram which illustrates a configuration of a second contact portion of a lens barrel of a light distribution control component according to Variation 2.

Alternatively, as illustrated in FIG. 26B, a configuration of second contact portion 332B which further includes guide ribs 332d each extending upwardly or downwardly from a tip of a corresponding one of the pair of upper and lower ribs 332a of second contact portion 332 illustrated in FIG. 23 may be employed. As described above, by including guide ribs 332d, when first contact portion 331 of one of lens barrels 330 is inserted to second contact portion 332 of another of lens barrels 330, first contact portion 331 is in contact with guide rib 332d, and thus it is possible to easily insert first contact portion 331 to the pair of upper and lower ribs 332a.

Figure 26C:
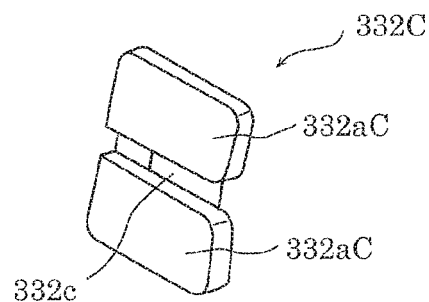
FIG. 26C is a diagram which illustrates a configuration of a second contact portion of a lens barrel of a light distribution control component according to Variation 3.

Alternatively, as illustrated in FIG. 26C, a configuration of second contact portion 332C which includes a pair of step portions 332aC each having a flat shape may be employed in place of the pair of upper and lower ribs 332a in second contact portion 332A illustrated in FIG. 26A.

Figure 26D:
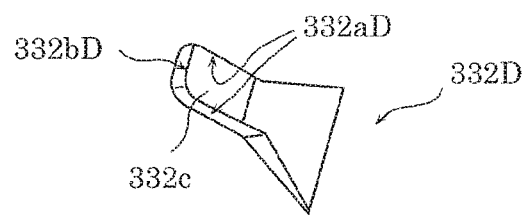
FIG. 26D is a diagram which illustrates a configuration of a second contact portion of a lens barrel of a light distribution control component according to Variation 4.

Alternatively, as illustrated in FIG. 26D, a configuration of second contact portion 332D which has a depression may be employed in place of second contact portion 332 which has a protrusion as illustrated in FIG. 23 and FIG. 26A to FIG. 26C. Second contact portion 332D includes a step portion which includes a pair of upper and lower inner walls 332aD which restricts vertical movement of first contact portion 331, rear inner wall 332bD located on the side opposite to a receiving opening portion of the pair of upper and lower inner walls 332aD, and sloped portion 332c located between the receiving opening portion of the pair of upper and lower inner walls 332aD and rear inner wall 332bD. In this case, first contact portion 331 of another of the plurality of lens barrels 330 is inserted to the step portion, and thereby adjacent two of the plurality of lens barrels 330 are fit together.

(Conclusion)

As described above, as a first feature of the present embodiment, mounting pedestal 100 according to the present embodiment includes substrate 110 which includes a plurality of bending portions 111 at which substrate 110 is bent in a staircase shape. In each of the plurality of bending portions 111, the corner R of a mountain portion is greater than the corner R of a valley portion.

With this configuration, even when interconnecting line 130 disposed on substrate 110 is formed to extend across the plurality of bending portions 111 as with the present embodiment, it is possible to effectively inhibit breaking of interconnecting line 130 as described above. This allows implementing mounting pedestal 100 which is highly reliable.

In addition, as a second feature of the present embodiment, mounting pedestal 100 according to the present embodiment includes substrate 110 on which uneven portion 114 is formed on a side face.

With this configuration, it is possible to increase a cooling effect on the side face of substrate 110 as described above. Accordingly, it is possible to enhance the heat dissipation performance of mounting pedestal 100. This allows implementing mounting pedestal 100 which is highly reliable.

In addition, as a third feature of the present embodiment, in mounting pedestal 100 according to the present embodiment, the surface of at least a portion of the mountain portion of bending portion 111 is rougher than the surface of first planar portion 112.

With this configuration, it is possible to enhance adhesion of insulating layer 120 formed on bending portion 111 in which film stripping of insulating layer 120 is likely to occur. This makes it possible to inhibit occurrence of film stripping of insulating layer 120 in bending portion 111. In addition, it is also possible to inhibit defects such as breaking of interconnecting line 130 due to film stripping of insulating layer 120. This allows implementing mounting pedestal 100 which is highly reliable.

In addition, as a fourth feature of the present embodiment, a component mounting module according to the present embodiment includes mounting pedestal 100 and a heat generating component mounted on mounting pedestal 100.

In this manner, the component mounting module according to the present embodiment includes mounting pedestal 100 which is highly reliable as described above, and thus it is possible to implement a component mounting module which excels in heat dissipation performance and is highly reliable.

In this case, according to the present embodiment, light emitting element 200 is disposed, as a heat generating component, on mounting pedestal 100, and the component mounting module is configured as light emitting module 10.

This allows implementing light emitting module 10 which excels in heat dissipation performance and is highly reliable.

In addition, as a fifth feature of the present embodiment, light emitting module 10 according to the present embodiment includes an optical component (first lens 310 and/or second lens 320) disposed in the light emitting direction of light emitting element 200, and a plurality of lens barrels 330 as holders for holding the optical component. The plurality of lens barrels 330 are disposed on the stairs of substrate 110 in a one-to-one relationship. One of the plurality of lens barrels 330 includes first contact portion 331 which is in contact with another of the plurality of lens barrels 330 adjacent to the one of the plurality of lens barrels 330.

According to this configuration, it possible to prevent the one of the plurality of lens barrels 330 from being damaged by contacting with the other of the plurality of lens barrels 330 adjacent to the one of the plurality of lens barrels 330 at an unexpected position.

In addition, a moving body according to the present embodiment is vehicle 1, and includes light emitting module 10 and vehicle body 3 on which light emitting module 10 is mounted.

This allows implementing vehicle 1 including light emitting module 10 which is highly reliable.

(Variation)

Although the mounting pedestal, etc. according to the present disclosure have been described on the basis of the embodiment, the present disclosure is not limited to the above-described embodiment.

For example, although mounting pedestal 100 includes two components, namely, first mounting pedestal 101 and second mounting pedestal 102 according to the above-described embodiment, mounting pedestal 100 may include three or more mounting pedestals.

In addition, although light emitting element 200 including an LED chip is disposed as a heat generating component on mounting pedestal 100 according to the above-described embodiment, the heat generating component is not limited to this example and may be any heat generating component as long as it generates heat. As the heat generating component, for example, a semiconductor light emitting element other than an LED chip may be used, or a semiconductor element such as an FET, a coil, or an electronic component such as a resistor may be employed instead of a light emitting device.

In addition, although light emitting element 200 is a BY-type white LED light source including the blue LED chip and the yellow phosphor to emit white light according to the above-described embodiment, the present disclosure is not limited to this example. For example, white light may be emitted by using a red phosphor and a green phosphor, and combining the blue LED chip with the red phosphor and the green phosphor. In addition, in order to enhance color rendering properties, a red phosphor or a green phosphor may further be mixed in addition to the yellow phosphor. Moreover, an LED chip which emits light having a color other than blue may be used. For example, an LED chip which emits ultraviolet light may be used, and white light may be emitted using each of RGB phosphors (blue phosphor, green phosphor, and red phosphor) which emits fluorescent light as a result of the ultraviolet light being excited. In addition, a red LED chip which emits red light, a green LED chip which emits green light, and a blue LED chip which emits blue light may be used to emit white light, instead of using a phosphor.

In addition, although light emitting element 200 is only a white LED light source in the above-described embodiment, the present disclosure is not limited to this example. For example, light emitting module 10 may include a red LED light source which emits red light, a green LED light source which emits green light, and a blue LED light source which emits blue light. Alternatively, light emitting module 10 may include a red LED light source, a green LED light source, a blue LED light source, and a while LED light source. As described above, light sources which emit light's three primary colors are used, thereby making it possible to implement a lighting device capable of performing toning control using RGB control. Furthermore, light emitting module 10 may include a plurality of white LED light sources having different color temperatures. With this configuration, it is possible to implement a lighting device capable of changing a color temperature.

In addition, although light emitting module 10 is an SMD type in which an SMD LED element is used as light emitting element 200 according to the above-described embodiment, the present disclosure is not limited to this example, and light emitting module 10 may be a COB type. In this case, for example, a plurality of LED chips (bear chips) are arranged on mounting pedestal 100 as light emitting elements 200, and the plurality of LED chips are collectively or individually sealed by a sealing component (phosphor-containing resin, etc.).

In addition, although light emitting element 200 includes an LED according to the above-described embodiment, the present disclosure is not limited to this example. For example, light emitting element 200 may include a semiconductor light emitting element such as a semiconductor laser, etc., or a solid-state light emitting element such as an organic electro luminescence (EL) or an inorganic EL.

In addition, although an example in which vehicle 1 includes two lighting devices 2 has been described in the above-described embodiment, the present disclosure is not limited to this example. For example, vehicle 1 may include a single lighting device 2, or may include three or more lighting devices 2.

In addition, although an example in which lighting device 2 including light emitting module 10 is applied to a headlight has been described in the above-described embodiment, lighting device 2 may be applied to a fog lamp, a daylight running lamp (DRL), or a daytime running light (DRL), or may be applied to a back light.

In addition, although a four-wheeled vehicle is exemplified in the above-described embodiment as one example of vehicle 1 on which lighting device 2 is mounted, the present disclosure is not limited to this example. Other vehicles such as a two-wheeled vehicle (motorbike) may be employed as the vehicle. In addition, lighting device 2, may be mounted on a moving body other than a vehicle (for example, a train, an aircraft, a ship, etc.).

It should be noted that the present disclosure also includes other forms in which various modifications apparent to those skilled in the art are applied to the above-described embodiment and variation examples or forms in which structural components and functions in the above-described embodiment and variation examples are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A mounting pedestal on which a heat generating component is disposed, the mounting pedestal comprising:
   a substrate which includes a plurality of bending portions at which the substrate is bent in a staircase shape;
   an insulating layer disposed on a surface of the substrate; and
   an interconnecting line disposed on the insulating layer, wherein
   the interconnecting line extends across the plurality of bending portions, and
   in each of the plurality of bending portions, a corner radius (R) of a mountain portion is greater than a corner R of a valley portion.

2. The mounting pedestal according to claim 1, wherein
   the substrate includes a first planar portion on which the heat generating component is disposed, and a second planar portion located adjacent to the first planar portion across one of the plurality of bending portions,
   the first planar portion comprises a plurality of first planar portions and the second planar portion comprises a plurality of second planar portions, and
   the substrate is bent in the staircase shape in which the plurality of first planar portions and the plurality of second planar portions are alternately arranged.

3. The mounting pedestal according to claim 2, wherein the plurality of first planar portions are arranged radially.

4. The mounting pedestal according to claim 2, wherein
   the interconnecting line includes a first line portion on each of the plurality of first planar portions and a second line portion on each of the plurality of second planar portions, and
   the first line portion is slanted with respect to an edge of the mountain portion of each of the plurality of bending portions.

5. The mounting pedestal according to claim 4, wherein when the first planar portion and the second planar portion are unfolded in a planar shape, the first line portion and the second line portion form a straight line.

6. The mounting pedestal according to claim 2, further comprising:
   a power supply terminal electrically connected to the interconnecting line, wherein
   the power supply terminal is on only one of a foot and a head of the substrate being bent in the staircase shape.

7. The mounting pedestal according to claim 6, wherein
   one of the plurality of first planar portions which corresponds to the one of the foot and the head of the substrate is an extended portion having a tread length greater than a tread length of others of the plurality of first planar portions, and
   the power supply terminal is on the extended portion.

8. The mounting pedestal according to claim 2, wherein the substrate includes a side face including an uneven portion.

9. The mounting pedestal according to claim 8, wherein the uneven portion protrudes in a mountain-side region on the side face of each of the plurality of bending portions, and is depressed in a valley-side region on the side face of each of the plurality of bending portions.

10. The mounting pedestal according to claim 8, wherein
    each of the plurality of first planar portions includes a shape in which a tread length gradually narrows from a first end to a second end in a width direction of the substrate, and
    a density of protrusions and depressions of the uneven portion on the side face of the second end of each of the plurality of first planar portions is higher than a density of protrusions and depressions of the uneven portion on the side face of the first end of each of the plurality of first planar portions.

11. The mounting pedestal according to claim 2, wherein a surface of at least a portion of the mountain portion of each of the plurality of bending portions is rougher than a surface of each of the plurality of first planar portions.

12. The mounting pedestal according to claim 11, wherein
in each of the plurality of bending portions, a surface roughness of a portion in proximity to an edge of the mountain portion is greater than a surface roughness of at least a portion other than the portion in proximity to the edge of the mountain portion.

13. The mounting pedestal according to claim 11, wherein
each of the plurality of first planar portions includes a shape in which a tread length gradually narrows from a first end to a second end in a width direction of the substrate, and
an average value of a surface roughness in a first region close to the second end of each of the plurality of first planar portions is higher than an average value of a surface roughness in a second region close to the first end of each of the plurality of first planar portions.

14. The mounting pedestal according to claim 1, wherein
each of the plurality of bending portions includes a bending angle greater than 90 degrees.

15. A component mounting module, comprising:
the mounting pedestal according to claim 1; and
a heat generating component on the mounting pedestal.

16. The component mounting module according to claim 15, wherein
the heat generating component is a light emitting element, and
the component mounting module is a light emitting module.

17. The component mounting module according to claim 16, further comprising:
an optical component disposed in a light emitting direction of the light emitting element; and
a holder which holds the optical component.

18. The component mounting module according to claim 17, wherein
the holder comprises a plurality of holders,
the plurality of holders are disposed on stairs of the substrate in a one-to-one relationship, and
one of the plurality of holders includes a first contact portion which is in contact with an other of the plurality of holders adjacent to the one of the plurality of holders.

19. The component mounting module according to claim 18, wherein
the first contact portion includes a protrusion that protrudes from the one of the plurality of holders toward the other of the plurality of holders.

20. The component mounting module according to claim 19, wherein
the other of the plurality of holders includes a second contact portion which is in contact with the first contact portion, the second contact portion including a receiver that receives the protrusion of the one of the plurality of holders.

21. The component mounting module according to claim 19, wherein
the one of the plurality of holders is fixed to the mounting pedestal with the protrusion being pressed between the one of the plurality of holders and the other of the plurality of holders.

22. The component mounting module according to claim 18, wherein
the first contact portion comprises a plurality of first contact portions,
the plurality of holders include the plurality of first contact portions in one-to-one relationship, and
each of the plurality of first contact portions of the plurality of holders is different in shape.

23. A moving body, comprising
the component mounting module according to claim 16; and
a vehicle body on which the component mounting module, which is the light emitting module, is mounted.

24. The mounting pedestal according to claim 1, wherein the substrate is formed from a rigid metal plate.

* * * * *